United States Patent [19]
Dolby

[11] Patent Number: 6,016,473
[45] Date of Patent: Jan. 18, 2000

[54] LOW BIT-RATE SPATIAL CODING METHOD AND SYSTEM

[76] Inventor: Ray M. Dolby, 3340 Jackson St., San Francisco, Calif. 94118

[21] Appl. No.: 09/056,503

[22] Filed: Apr. 7, 1998

[51] Int. Cl.[7] .................................................. G10L 3/02
[52] U.S. Cl. ............................................ 704/500; 704/501
[58] Field of Search ..................................... 704/500, 501

[56] References Cited

U.S. PATENT DOCUMENTS

| | | |
|---|---|---|
| Re. 29,490 | 12/1977 | Shamma . |
| Re. 30,278 | 5/1980 | Stumpf et al. . |
| 871,992 | 7/1907 | Percival . |
| 1,124,580 | 1/1915 | Amet . |
| 1,793,772 | 2/1931 | Bouma . |
| 1,850,130 | 3/1932 | Gannett . |
| 2,361,490 | 10/1944 | Mueller . |
| 2,714,633 | 8/1955 | Fine . |
| 3,067,287 | 12/1962 | Percival . |
| 3,067,292 | 12/1962 | Minter, II . |
| 3,200,207 | 8/1965 | Rainer, et al. . |
| 3,272,906 | 9/1966 | De Vries et al. . |
| 3,836,715 | 9/1974 | Ito et al. . |
| 3,845,572 | 11/1974 | McCanney . |
| 3,848,092 | 11/1974 | Shamma . |
| 3,907,412 | 9/1975 | Schaller et al. . |
| 3,934,086 | 1/1976 | Takahashi . |
| 3,952,157 | 4/1976 | Takahashi et al. . |
| 3,973,839 | 8/1976 | Stumpf et al. . |
| 4,236,039 | 11/1980 | Cooper . |
| 4,251,688 | 2/1981 | Furner . |
| 4,256,389 | 3/1981 | Engebretson . |
| 4,455,649 | 6/1984 | Esteban et al. . |
| 4,620,225 | 10/1986 | Wendland et al. . |
| 4,713,776 | 12/1987 | Araseki . |
| 5,109,417 | 4/1992 | Fielder et al. . |
| 5,323,396 | 6/1994 | Lokhoff . |

FOREIGN PATENT DOCUMENTS

| | | |
|---|---|---|
| 0357402 | 3/1990 | European Pat. Off. . |
| 0372601. | 6/1990 | European Pat. Off. . |
| 0402973 | 12/1990 | European Pat. Off. . |
| 0497413 | 8/1992 | European Pat. Off. . |
| WO9009022 | 8/1990 | WIPO . |
| WO9016136 | 12/1990 | WIPO . |
| WO9319542 | 9/1993 | WIPO . |

OTHER PUBLICATIONS

Joint Stereo Coding, Annex G, Coding of Moving Pictures and Associated Audio, Part 3 Audio, pp. 2 + G1–G4, Dec. 31, 1991.

HDTV Sound Systems: How Many Channels, Gunther Theile, AES 9th International Conference, Feb. 1, 1991, pp. 217–232.

Musicam–Surround: A Multi–Channel Stereo Coding Method, Gunther Theile, et al., AES 92nd Convention, Mar. 24, 1992, pp. 1–9.

(List continued on next page.)

Primary Examiner—David R. Hudspeth
Assistant Examiner—Daniel Abebe
Attorney, Agent, or Firm—Gallagher & Lathrop; Thomas A. Gallagher

[57] ABSTRACT

A spatial audio coding system, including an encoder and a decoder, operates at very low bit-rates and is useful for audio via the Internet. The listener or listeners preferably are located within a predictable listening area, for example, users of a personal computer or television viewers. An encoder produces a composite audio-information signal representing the soundfield to be reproduced and a directional vector or "steering control signal." The composite audio-information signal has its frequency spectrum broken into a number of subbands, preferably commensurate with the critical bands of the human ear. The steering control signal has a component relating to the dominant direction of the soundfield in each of the subbands. Because the system is based on the premise that only sound from a single direction is heard at any instant, the decoder need not apply a signal to more than two sound transducers at any instant.

48 Claims, 12 Drawing Sheets

OTHER PUBLICATIONS

Berlin Meeting Documents, Leonardo Chiariglione —Convenor, International Organization for Standardization, Dec. 1990, Appendix pp. 100–103.

Minimally Audible Noise Shaping, Stanley P. Lipshitz, et al., J. Audio Eng. Soc., vol. 39, No. 11 Nov. 1991, pp. 836–852.

Subband Coding of Stereophonic Digital Audio Signals, Robbert G. van der Waal, et al., IEEE, 1991, pp. 3601–3604.

The ISO Audio Coding Standard, Hans Georg Musmann, Globecom 90 IEEE Global Telecommunications Conference & Exhibition , "Communications: Connecting the Future," Dec. 2, 1990, pp. 0511–0517.

Digital Audio Carrying Extra Information, W.R. Th. Ten Kate, et al. IEEE, CH.2847, Feb. 1, 1990, pp. 1097–1100.

Musicam, Detailed description of Sound Coding Algorithm, International Organization for Standardization, Dec. 28, 1989.

Numerical Recipes, The Art of Scientific Computing, William H. Press, et al., Cambridge University Press, 1986, pp. 52–64; 254–259.

Compatible Stereophonic Broadcasting Systems for Spatial Reproduction, J. J. Geluk, Journal of the Audio Engineering Society, Mar., 1980, vol. 28, No. 3, pp. 136–139.

Quadraphony—A Review, J. G. Woodward, Journal of the Audio Engineering Society, Oct./Nov. 1997, vol. 25, No. 10/11, pp. 843–854.

Sound–Image Localization in Multichannel Matrix Reproduction, Osamu Kohsaka, et al., Journal of the Audio Engineering Society, Sep. 1972, vol. 20, No. 7, pp. 542–548.

A Compressed–Bandwidth Stereophonic System for Radio Transmission, Percival, the Institution of Electrical Engineers, paper No. 3152 E, Nov., 1959, pp. 234–238.

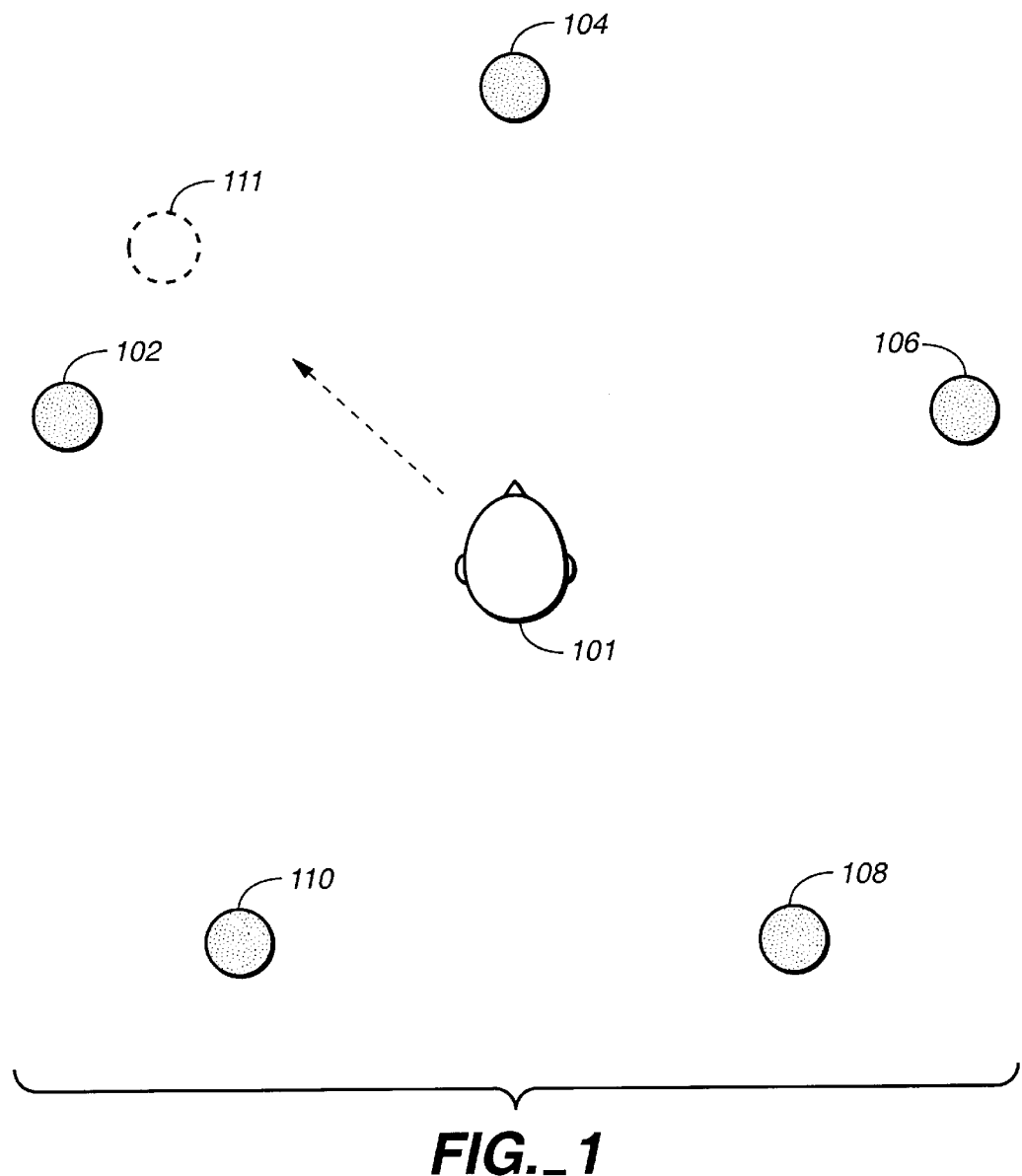
FIG._1

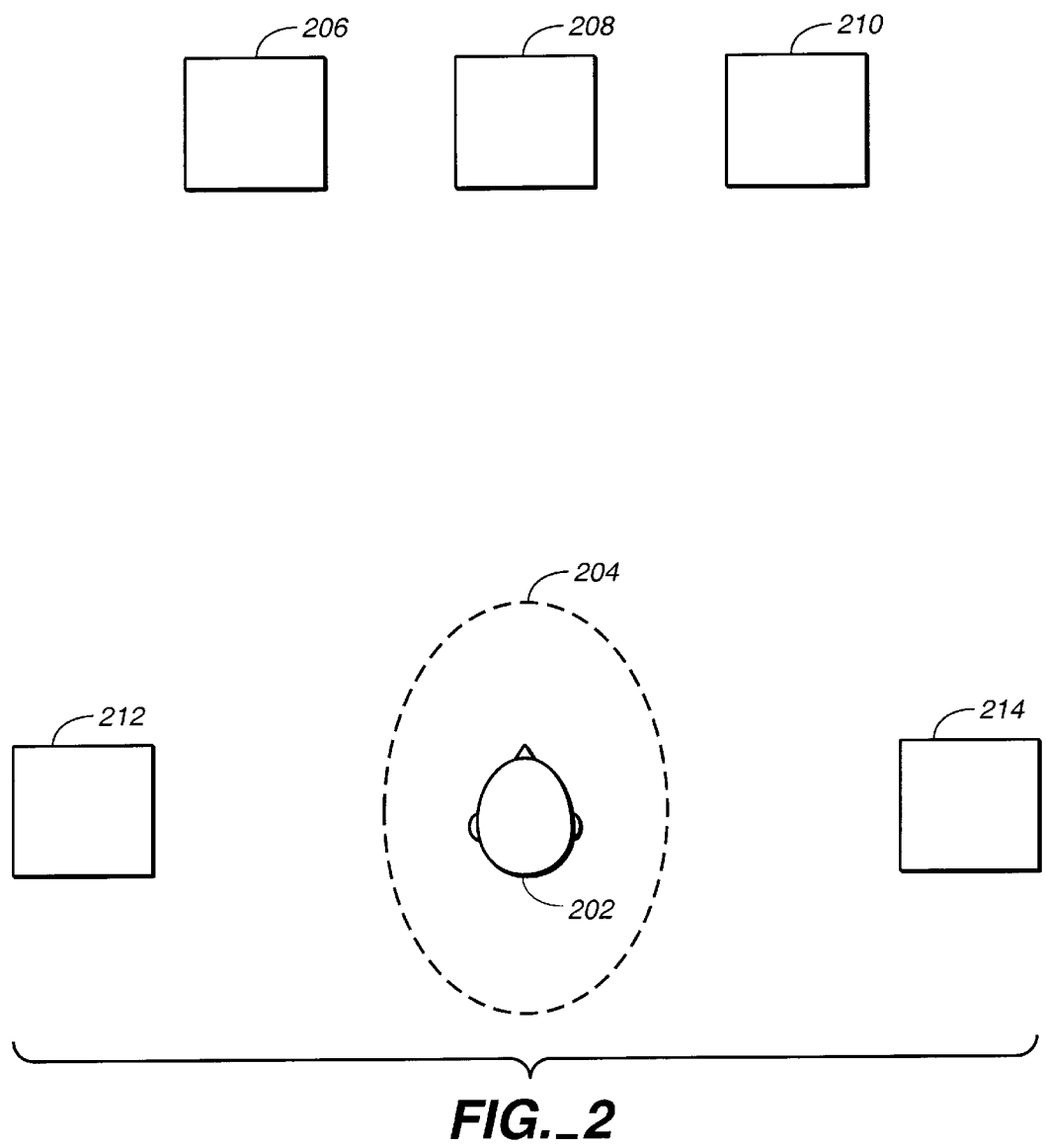
FIG._2

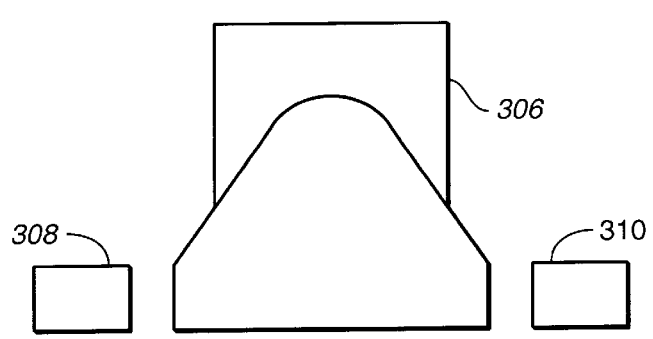
FIG._3
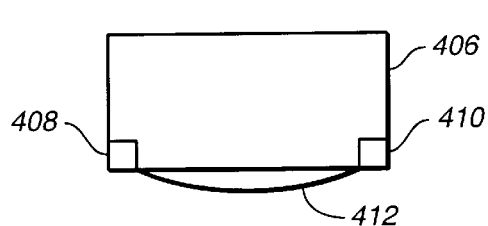
FIG._4

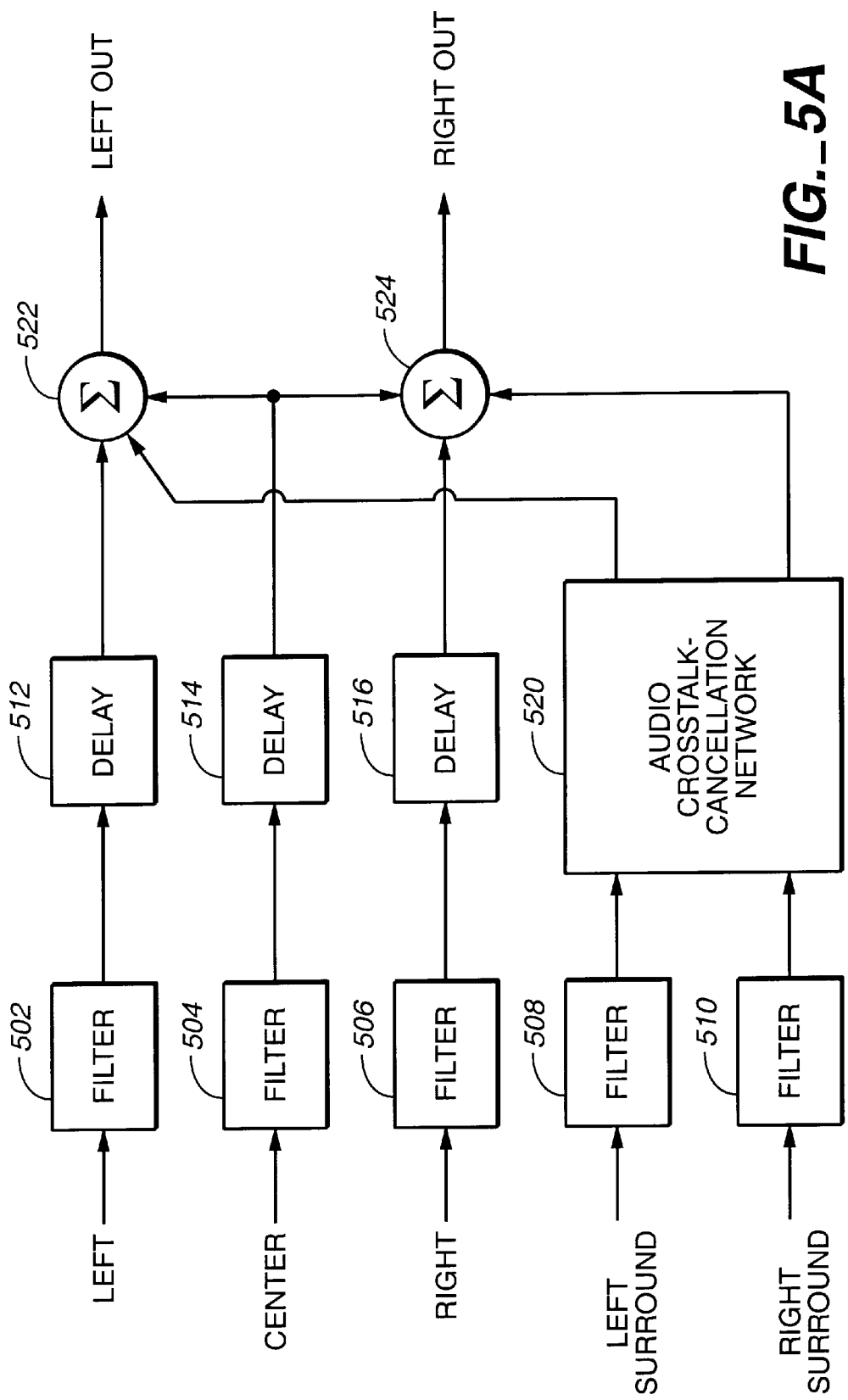
FIG._5A

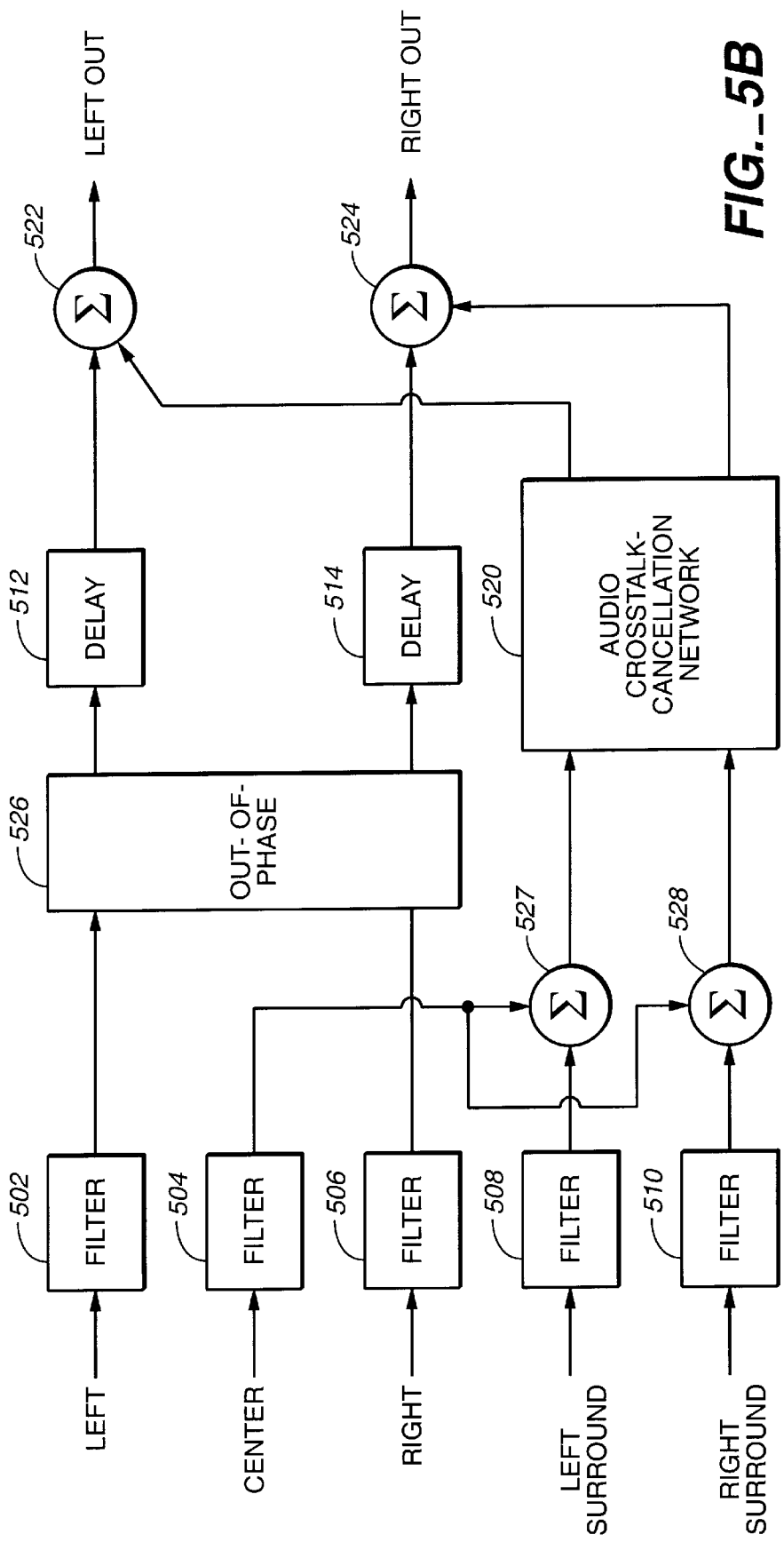
FIG._5B

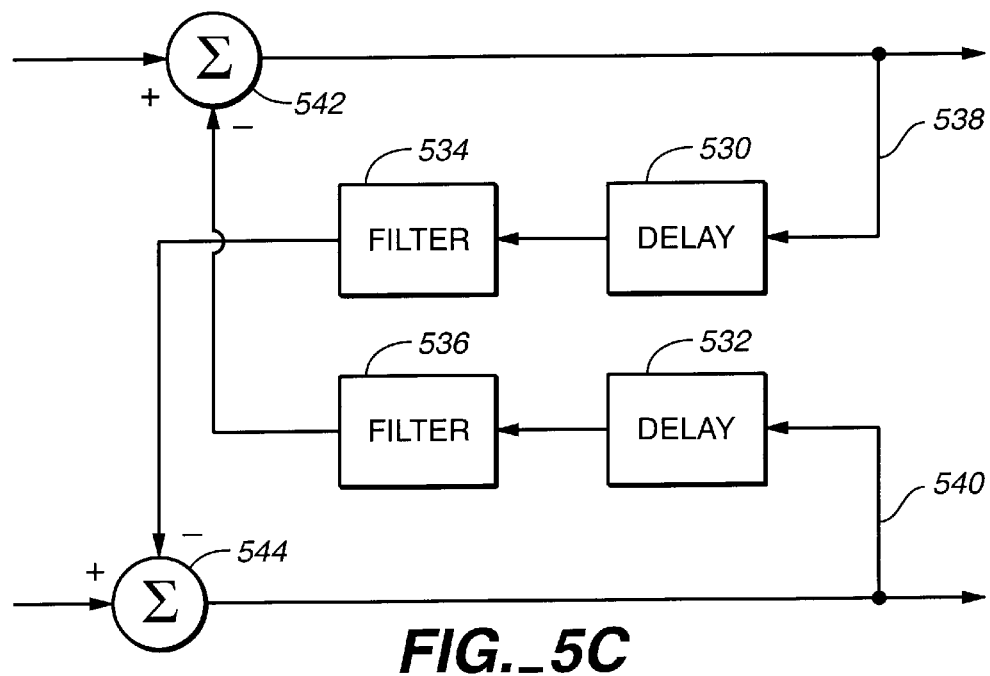
FIG._5C
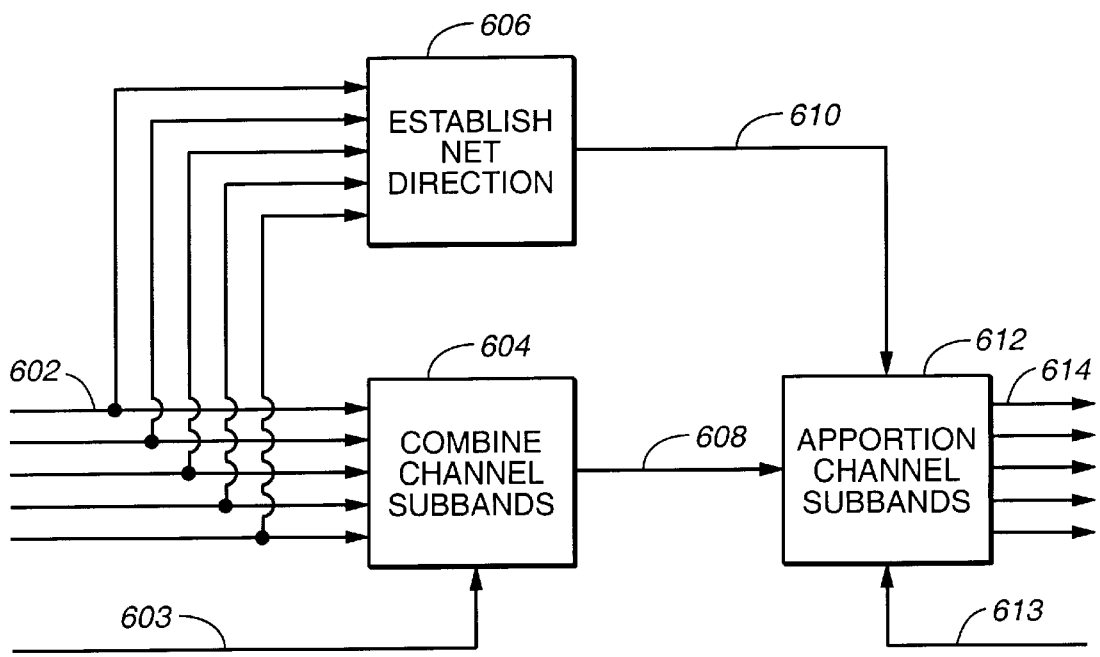
FIG._6

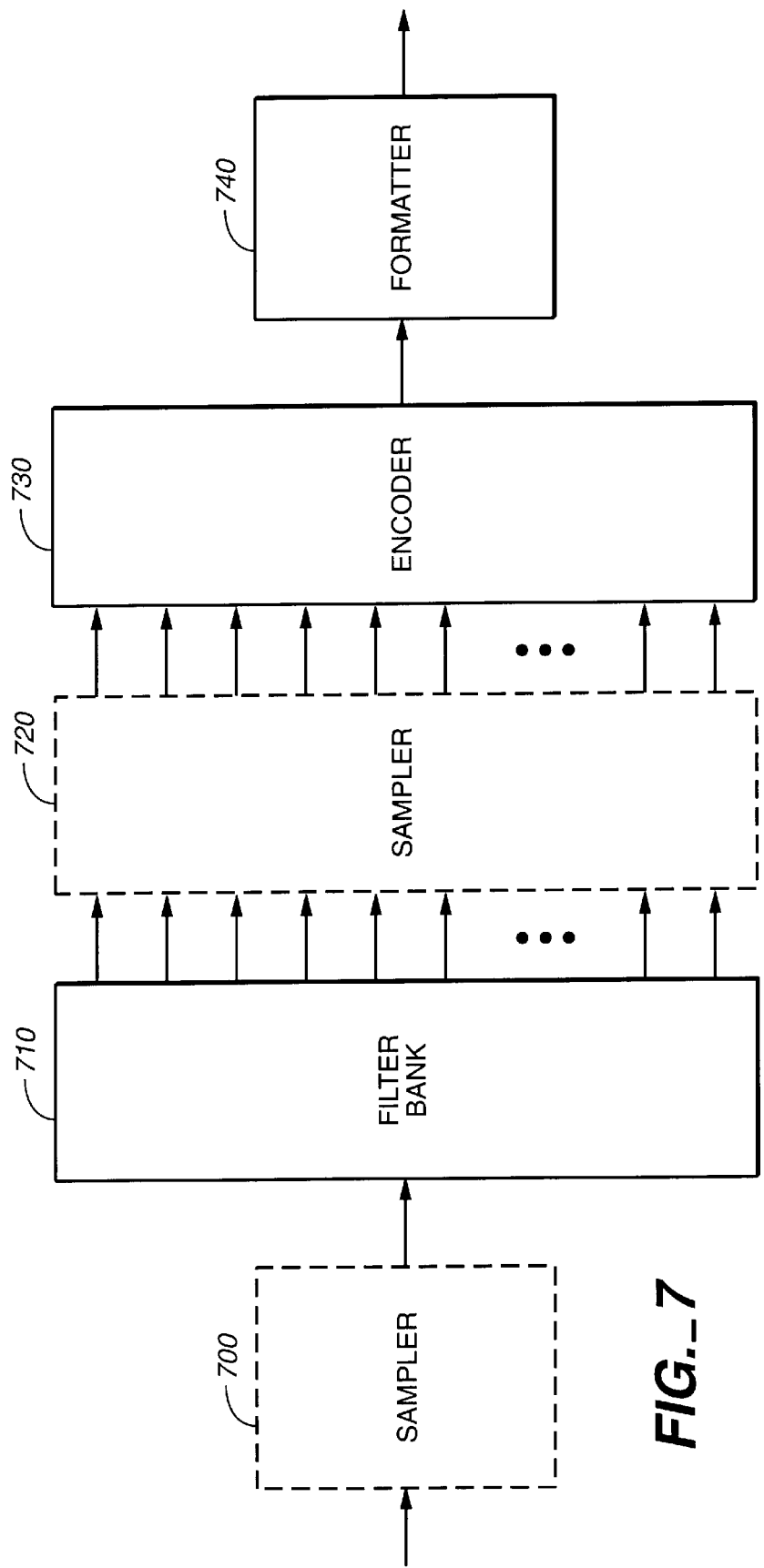

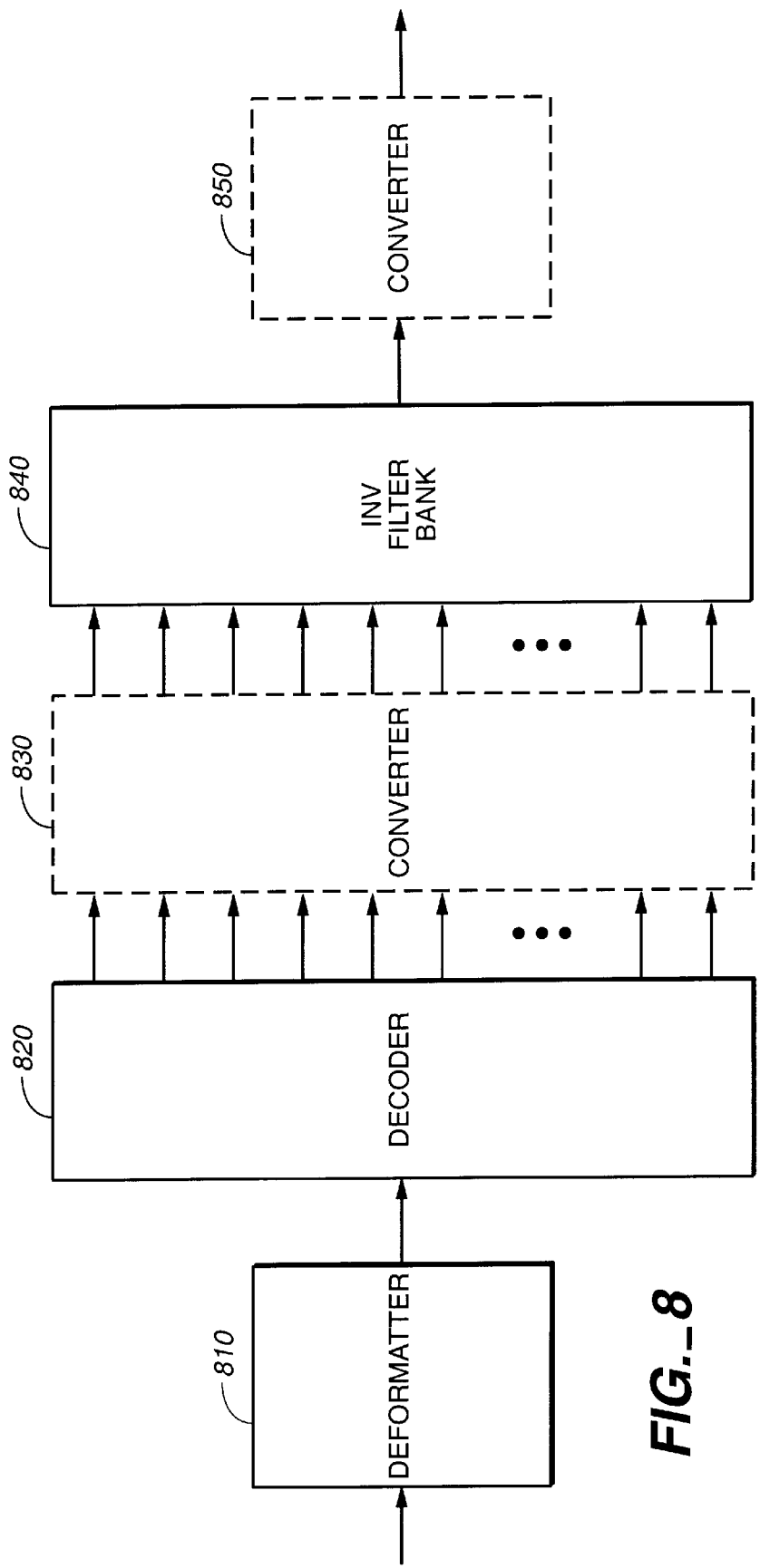
FIG._8

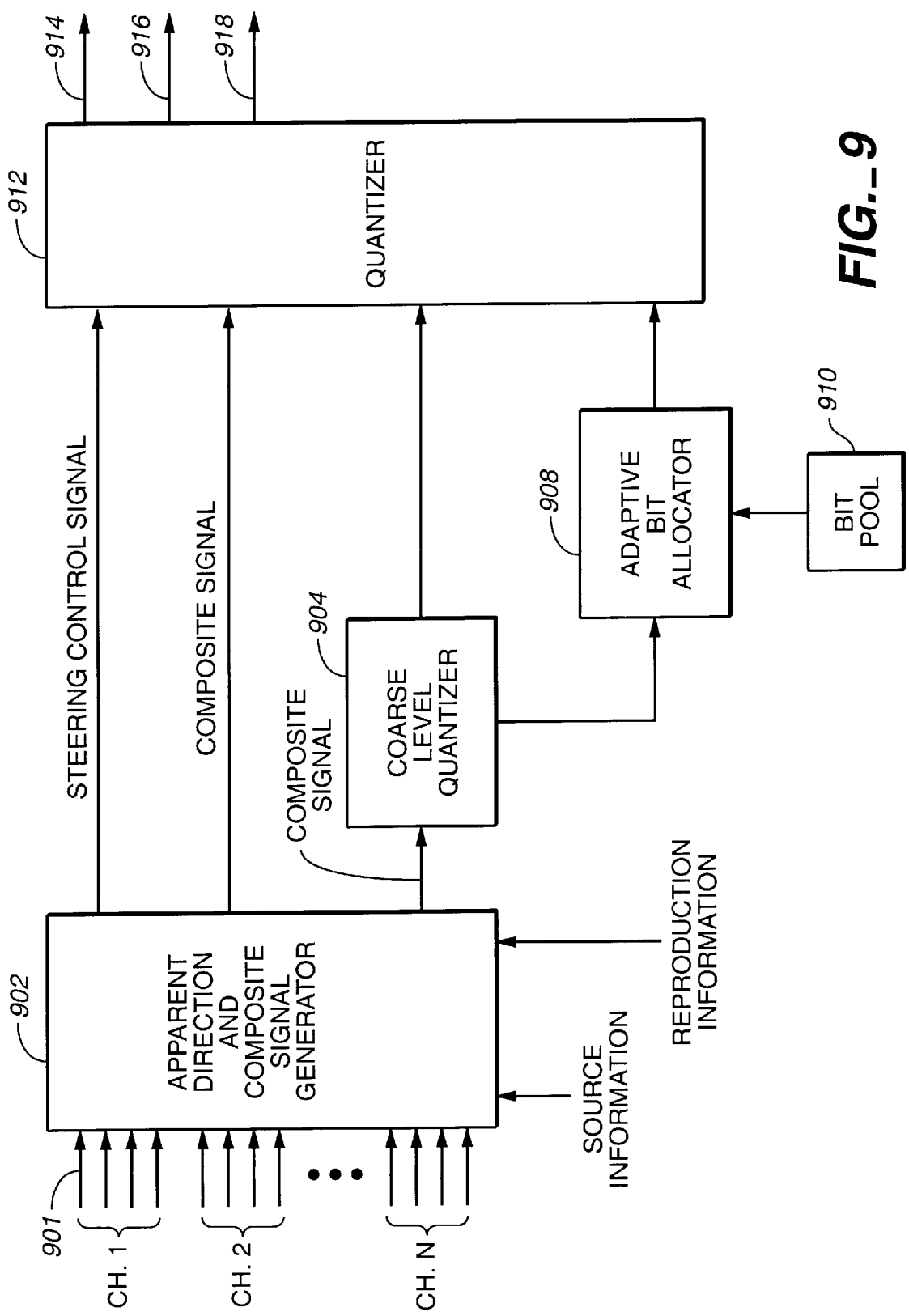
FIG._9

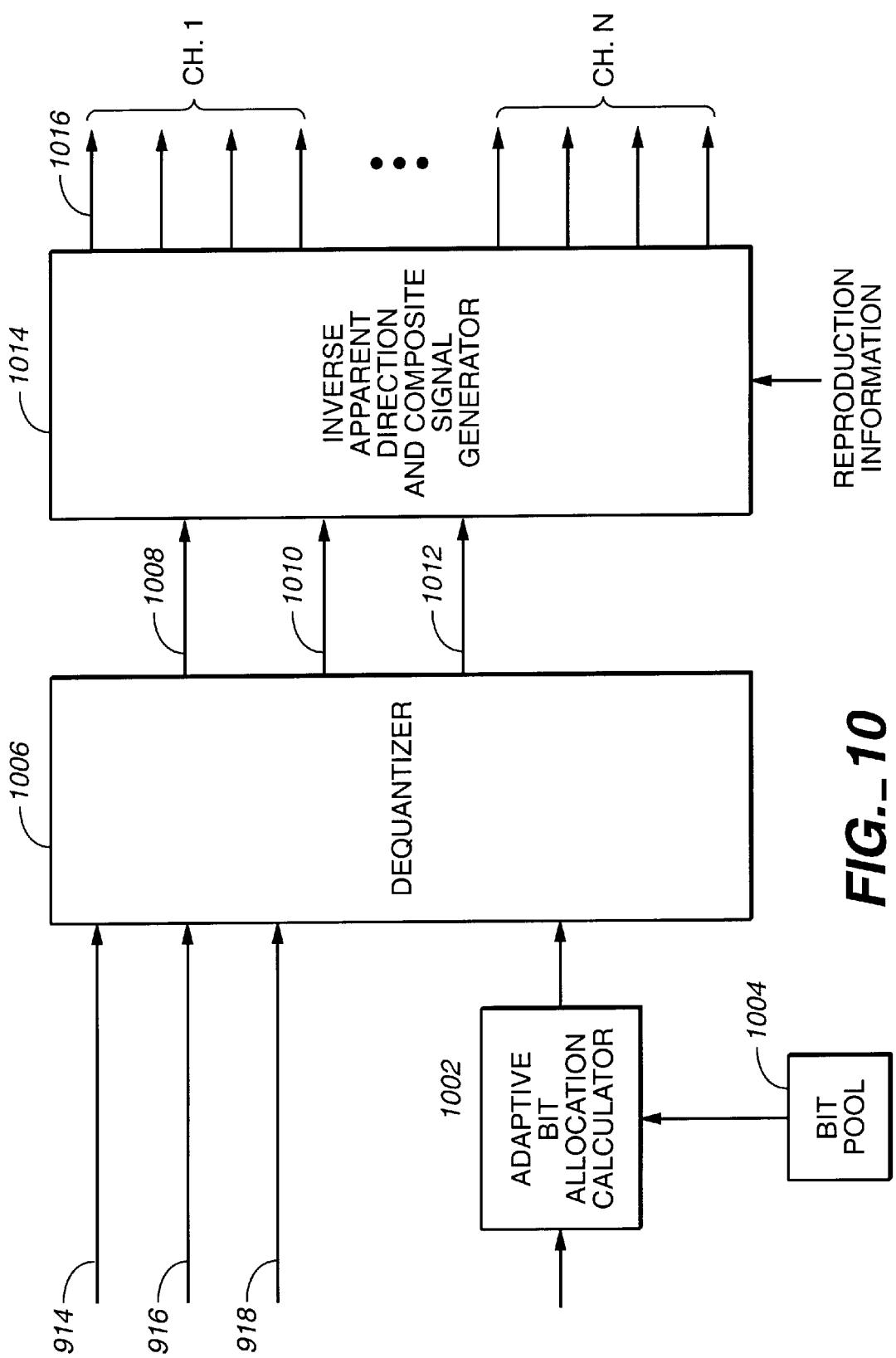
FIG._10

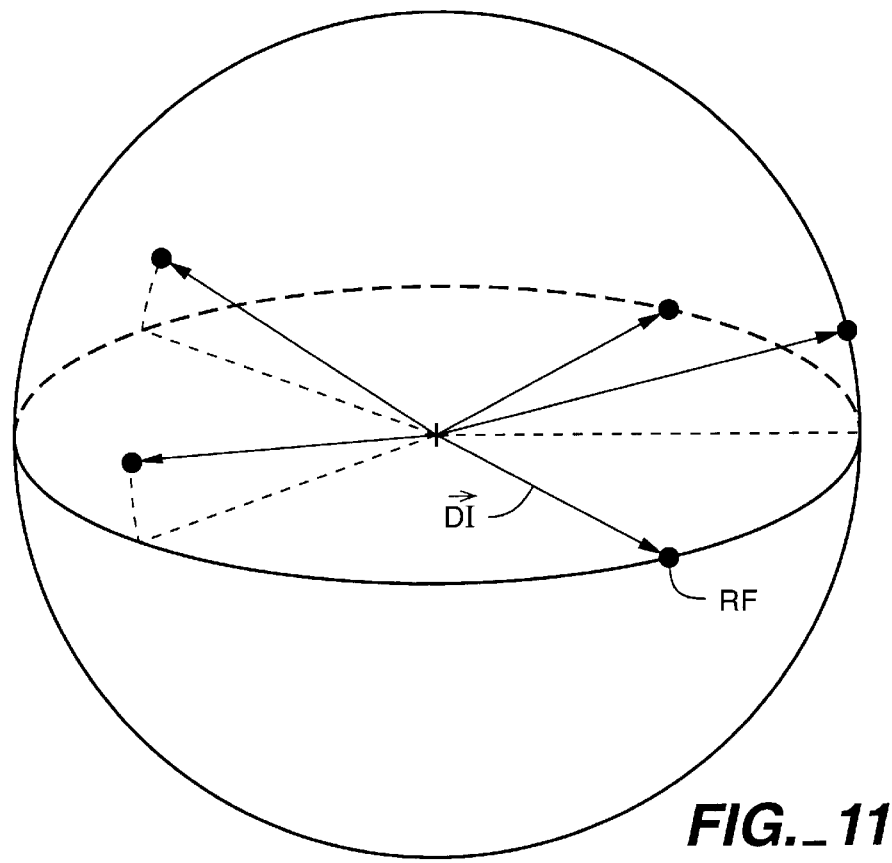
FIG._11
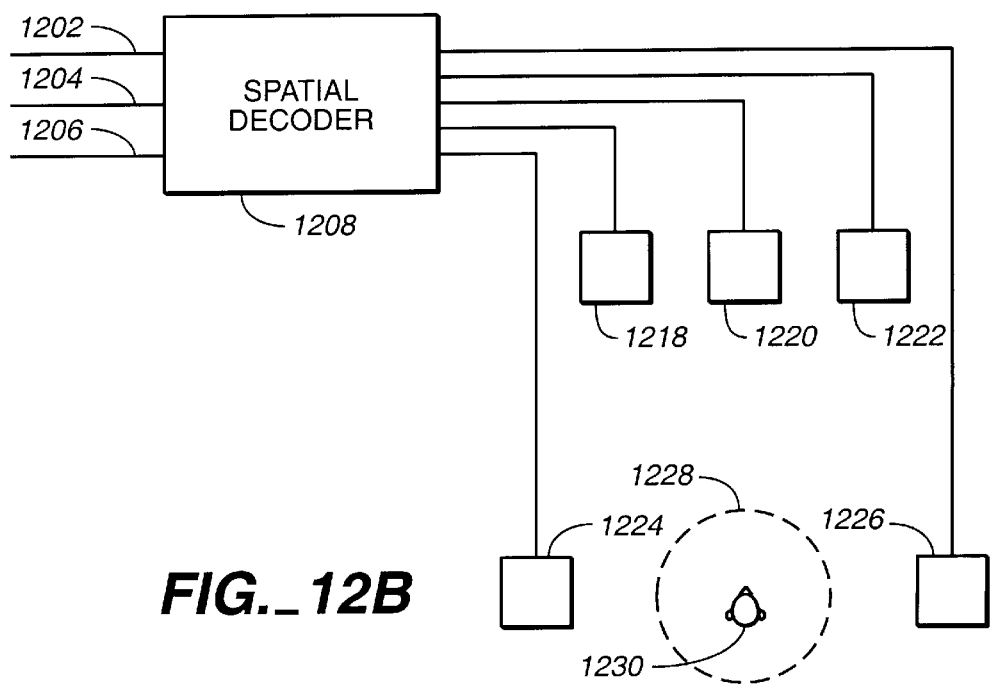
FIG._12B

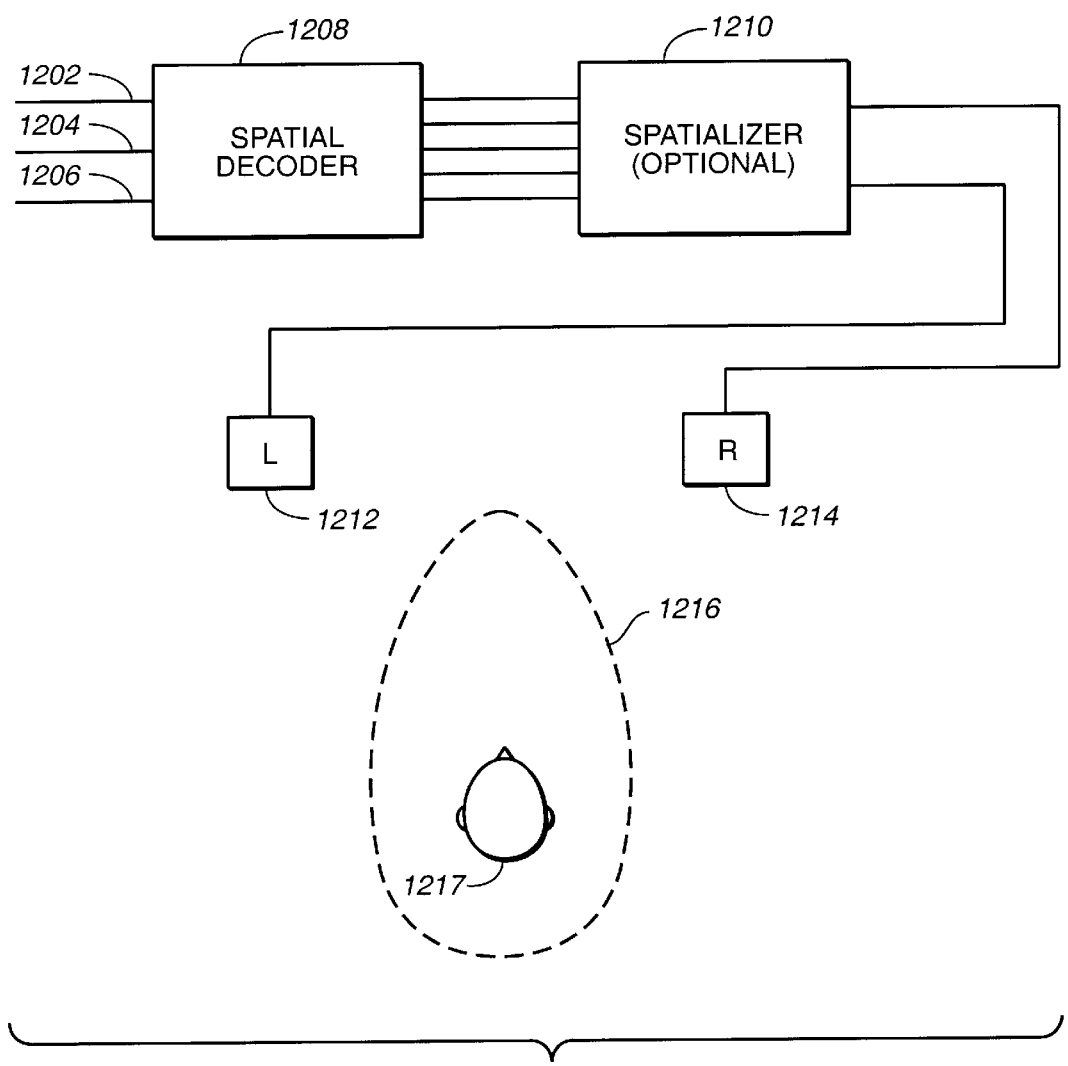
FIG._12A

LOW BIT-RATE SPATIAL CODING METHOD AND SYSTEM

TECHNICAL FIELD

The invention relates in general to the recording, transmitting, and reproducing of multi-dimensional soundfields intended for human hearing. More particularly, the invention relates to improvements to a perceptual coding system, encoders and decoders therefor, and methods therefor, in which encoded signals are carried by a composite audio signal and a directional vector. The invention is particularly adapted for use in systems requiring extremely low bit rates.

BACKGROUND

U.S. Pat. Nos. 5,583,962, 5,632,005 and 5,633,981 describe two reduced-bit-rate perceptual-coding systems for audio signals, designated therein as "Type I" and "Type II." Each of said U.S. Pat. Nos. 5,583,962, 5,632,005, and 5,633,981 patents is hereby incorporated by reference in its entirety. According to a principle underlying both systems, an encoder generates frequency subband signals in response to input audio signal streams, the subbands corresponding generally to the human ear's critical bands.

In the encoder of the Type I system described in said patents, each audio stream is encoded independently when there is a sufficient number of bits available. When there is a shortage of bits, the signal components in some or all of the subbands are combined into a composite signal and a plurality of scale factors, one scale factor for each input audio stream, each scale factor based on some measure of the subband signal components in each of the audio streams. The Type I decoder reconstructs a representation of the original signal streams from the composite signal and scale factors. The Type I system thus provides a bit savings or coding gain over a dedicated discrete system in which each audio stream is encoded independently. The Type I system is employed in AC-3 coding, which forms the basis of a the Dolby Digital perceptual coding system, in which 5.1 audio channels (left, center, right, left surround, right surround and a limited-bandwidth subwoofer channel) are encoded into a reduced bit-rate data stream.

In the encoder of the Type II system described in said patents, each audio stream is encoded independently when there is a sufficient number of bits available. When there is a shortage of bits, the signal components in some or all of the subbands are combined into a composite signal and one or more directional vectors, the directional vectors indicating the one or more principal directions of a soundfield represented by the audio streams. The Type II decoder reconstructs a representation of the soundfield represented by the original signal streams from the composite signal and the one or more directional vectors. The Type II system thus provides a bit savings or coding gain over a dedicated discrete system in which each audio stream is encoded independently and over the Type I system in which the composite signal is associated with scale factors for each audio stream.

The Type I and Type II systems described in said patents are adaptive in several ways. One aspect of their adaptivity is that one or more of the frequency subbands may operate some of the time in a "discrete" mode such that all of the subband components of the audio streams in the frequency subband are each independently encoded and decoded, while a shortage of bits, for example, causes the subband components of the audio streams in a particular frequency subband to be encoded according to the Type I approach or the Type II approach.

It is also known to change back and forth adaptively from a Type I to a Type II mode of operation within one or more frequency subbands. Such arrangements are the subject of the U.S. patent application of Mark Franklin Davis, Ser. No. 08/895,496, filed Jul. 16, 1997, entitled "Method and Apparatus for Encoding and Decoding Multiple Audio Channels at Low Bit Rates." Because the Type II approach requires fewer bits than does the Type I approach, a short term shortage of bits may be overcome by employing Type II encoding and decoding.

SUMMARY OF THE INVENTION

The present invention relates to Type II coding, encoders and decoders therefor, and to environments in which such decoders are advantageously employed. In particular, the present invention is directed to new aspects of Type II encoders, decoders, and to decoder environments that are not disclosed in said U.S. Pat. Nos. 5,583,962, 5,632,005 and 5,633,981. Although the specific embodiments disclosed herein relate to a simplified version of Type II in which the encoder and decoders preferably are dedicated Type II devices and a single directional vector is employed, certain aspects of the improvements to Type II coding that are the subject of the invention may be employed in more complex forms of Type II systems including the adaptive arrangements described in said '962, '005 and '981 patents and in an adaptive Type I/Type II system such as that described in said copending Davis application. The spatial nature of the coding, by way of a directional vector, in the simplified single directional vector version of the Type II coder suggests that it might be called a "spatial coder." Throughout this document, the single vector version of Type II coding of said '962, '005 and '981 patents is referred to as "spatial coding."

The inventor believes that, within a sufficiently short time interval, in the order of a small number of milliseconds, the human ear is able to hear sound only from a single direction in a critical band even when sounds from multiple directions, each at different frequencies within the critical band, are present. Consequently, for a system in which the directional vector is capable of changing within a sufficiently short time interval, the basic, single directional vector form of the Type II system embodied in a spatial coder is adequate to represent the soundfield even though it is unable to continuously and simultaneously reproduce all of a multiplicity of channels. This effect is illustrated conceptually in FIG. 1; listener 101 is perceiving that sounds within a subband come from point 111 between loudspeakers 102 and 104 even though sounds within the subband actually come from all of the loudspeakers 102 through 110.

This "single direction" effect bears some superficial similarity to the well-known "summing localization" effect. According to the latter effect, as described by Blauert (*Spatial Hearing: The Psychophysics of Human Sound Localization* by Jens Blauert, The MIT Press, Cambridge, Mass., revised edition, 1997), two or more sound sources radiating coherent signals within a certain amplitude of each other and within a certain time of each other yield the perception of a single phantom signal. See, particularly, pages 204, 271 and 272 of the Blauert text. According to Blauert, as a pair of initially coherent signals become less and less coherent, a listener is increasingly able to detect distinct signals. See, particularly, pages 240 and 242 of the Blauert text. However, according to the present inventor's single direction effect, as the separation in frequency between multiple signals diminishes to within a critical band, and the time interval is sufficiently short, the ability of a listener to perceive them as originating from distinct directions also diminishes.

The inventor recognizes that there is a trade off between the shortness of the time interval and the additional bit rate requirements (due to higher sampling rates) that may be required as the time interval is shortened (see the discussion below at page 21). Thus, for a very low bit rate system in which the sampling rate is less than optimum for the single direction effect, some loss in multi-directional multi-signal listener perception and accuracy in sound placement may occur under some signal conditions. The resulting reproduction is likely to provide, nevertheless, a pleasant and acceptable multi-directional listening experience. The present invention is particularly useful for use with transmission or recording systems in which bit rates are extremely limited, such as, for example audio via the Internet.

An aspect of the present invention is based on the recognition that the heretofore perceived shortcomings of spatial coding, principally a "signal ducking" effect, are in fact virtues when spatial coding is employed in a sound reproduction arrangement in which the listener or listeners are predictably located within a predetermined listening area. The invention is particularly suitable for use in listening environments in which one or perhaps two listeners are predictably located in what might be characterized as a "spatial coding sweet spot" as is explained below in connection with FIGS. 2, 3 and 4. The ability of spatial coding to produce an artifact-free soundfield within such a listening area, a spatial coding sweet spot, is an unexpected result. In the spatial coding sweet spot the signal ducking effect is not psychoacoustically perceived by a listener or listeners. A stable, normal soundfield is obtained.

FIG. 2 shows a listener 202 positioned in a predictable listening area, an idealized, essentially circular, spatial coding sweet spot 204, within five loudspeakers—left (206), center (208), right (210), left surround (212) and right surround (214), a typical "surround sound" playback arrangement.

In personal computer ("multimedia") sound systems, typically only two loudspeakers are employed, left and right speakers located adjacent to or near the computer monitor (and, optionally, a subwoofer, which may be remotely located, such as on the floor—in the present discussion, the subwoofer is ignored). The two loudspeakers create a relatively small optimum listening area. FIG. 3 shows a listener 302 positioned in a predictable listening area, an idealized spatial coding sweet spot 304, in front of a computer monitor 306 having left (308) and right (310) loudspeakers at its sides. More elaborate computer sound systems may employ more than two loudspeakers in the manner of the FIG. 2 arrangement (the computer monitor would be located at the same site as the center loudspeaker, between the left and right loudspeakers).

A similar small optimum listening area is created by some television sets in which a pair of loudspeakers is located on each side of the screen. FIG. 4 shows a listener 402 positioned in a predictable listening area, an idealized spatial coding sweet spot 404 in front of a television set 406 having left (408) and right (410) built-in loudspeakers adjacent its picture tube 412. More elaborate television sound systems may employ more than two loudspeakers in the manner of the FIG. 2 arrangement. For example, the television might have left, center and left loudspeakers integrated into its cabinet or those loudspeakers might be external to the television cabinet along with the surround loudspeakers.

The Dolby AC-3 system and many other systems do not fully exploit the predictable location of a listener in front of a computer or television sound system, thereby wasting bits in such environments. Although spatial coding is particularly useful in environments such as shown in FIGS. 1, 2 and 3, spatial coding is also useful in larger environments, it being understood that the size of the predictable listening area increases as the spacing among the loudspeakers increases. Spatial coding may also be useful in larger environments even for listeners outside the predictable listening area when employed only during brief bit-starved time intervals.

In a simplified surround sound system employing a spatial coder (i.e., a Type II system employing only a single directional vector), only enough information need be transmitted to satisfy a listener in a predictable listening area or spatial coding sweet spot. No attempt need be made to provide all the information necessary to recreate, for example, all five channels as accurate replicas of the five input channels, as is done in the AC-3 system. This results in a significant reduction of bits. Thus, the spatial coder is very efficient in not coding anything that cannot be heard in the predictable listening area at any instant. This simplified system may work even for, say, two listeners provided they are near each other and within the predictable location.

The "signal ducking" side effect of this simplified treatment is that if the listener moves out of the predictable location and puts an ear to any particular loudspeaker, a sound may appear and disappear as the program content changes—the signal ducking effect (the signal from a particular loudspeaker may "duck" or be modulated by signals from other channels). The effect is exactly what clarinetists have always known; their quiet offerings for the audience disappear with every trombone blast and miraculously reappear whenever they are out in the clear again. While such a side effect would be unacceptable in large audience commercial theaters and home theaters with listeners distributed throughout the room (rather than within a relatively small spatial coding sweet spot such as shown in FIG. 3), the effect is benign and inaudible to one or two listeners in a predictable listening area. However, as noted above, spatial coding may be useful in large audience commercial theaters and home theaters with listeners distributed throughout the room provided that it is employed only during brief time intervals, as, for example, during conditions of extreme bit shortage.

The signal ducking side effect of spatial coding is inaudible within the predictable listening area thus allowing the coder's bit requirements to be limited to those only absolutely necessary to generate a pleasant listening impression within that area. While not intended to provide a "straight wire with gain" result, a good practical, enjoyable effect is perceived within the spatial coding sweet spot with good localization and minimal artifacts.

In order to enhance the surround sound effect of a two loudspeaker computer or television sound reproduction arrangement, it is advantageous to "spatialize" the decoded spatial coder signals by employing a "spatializer" having an acoustic-crosstalk (or crossfeed) canceller. When presented over two speakers via conventional means, stereo material generally produces sonic images that are constrained to the speakers themselves and the space between them. This effect results from the crossfeed of the acoustic signal from each speaker to the far ear of a listener positioned in front of the computer monitor. By applying the surround channel signals to an acoustic-crosstalk canceller and summing the processed signals with the main left and right signals it is possible to render the perception that surround sound information is coming from virtual loudspeaker locations behind or to the side of a listener when only two forward-located loudspeakers are employed (the left and right channel signals come from the actual loudspeaker locations as they ordinarily would).

The origin of the acoustic-crosstalk canceller is generally attributed to B. S. Atal and Manfred Schroeder of Bell Telephone Laboratories (see, for example, U.S. Pat. No. 3,236,949, which is hereby incorporated by reference in its entirety). As originally described by Schroeder and Atal, the acoustic crossfeed effect can be mitigated by introducing an appropriate cancellation signal from the opposite speaker. Since the cancellation signal itself will crossfeed acoustically, it too must be canceled by an appropriate signal from the originally-emitting speaker, and so on.

FIG. 5A is a functional block diagram showing one type of spatializer having an audio crosstalk-cancellation network of the present invention can be employed. Five audio input signals, left, center, right, left surround and right surround, such as in the Dolby Digital AC-3 system are received. The inputs are applied, respectively, to optional DC blocking filters 502, 504, 506, 508 and 510. Optional delays 512, 514 and 516 in the left, center and right input lines have time delays commensurate with the time delay, if any, in the crosstalk-cancellation network 520. Ordinarily, there will be no time delay in the network 520 and delays 512, 514 and 516 are omitted unless network 556 includes, for example, an amplitude compressor/limiter. In this example, the inputs to the cancellation network 520 are the left surround and right surround inputs. A simplified embodiment of the cancellation network 520 is described in connection with the embodiment of FIG. 5C. Referring again to FIG. 5A, a first linear additive summer 522 receives the delayed left channel audio stream. A second linear additive summer 524 receives the delayed right channel audio stream. The delayed center channel audio stream is applied to summer 522 and summer 524. The processed left surround channel audio stream from network 520 is also applied to summer 522. The processed right surround channel audio stream from network 520 is also applied to summer 524. Only the left and right surround channel audio streams are processed by the cancellation network. The left and right front channels are added to the cancellation-network-processed left and right surround channels, respectively. The center channel is added in-phase into the left and right outputs without any additional processing.

The arrangement of FIG. 5A may also be employed when there are four input signals (left, center and right channels, a single surround channel) such as is provided by a Dolby Surround or Dolby Surround Pro Logic decoder. In that case, the single surround channel should be decorrelated into two pseudo-stereophonic signals, which are in turn applied to the inputs of the canceller. A simple pseudo-stereo conversion may be used employing phase shifting such that one signal is out of phase with the other. Many other pseudo-stereo conversion techniques are known in the art.

FIG. 5B shows additional alternatives to the spatializer of FIG. 5A. In FIG. 5B, the left and right front channels are widened slightly by partial antiphase mixing in block 526. Antiphase mixing to widen the apparent stereo "stage," is a well-known technique in the art. As another option, the center channel may be cancelled in order to minimize the coloration that results from having the center signal heard twice by each ear—once from near speaker and again from far speaker. Rather than requiring a separate canceller realization, the center channel acoustic crossfeed signals can be cancelled by applying them to the surround channel crosstalk-cancellation network. Thus, the center channel signal is mixed into the left surround and right surround inputs to the crosstalk-cancellation network 520 via linear additive summers 526 and 528, respectively.

FIG. 5C is a functional block diagram showing the basic elements of a simple acoustic-crosstalk canceller usable in the arrangements of FIG. 5A or FIG. 5B. Other, more complex, cancellers may be employed. Each delay 530 and 532 is typically about 140 $\mu$sec (microseconds) for speakers forwardly located with respect to a listener at ±15 degree angles, a typical angle for the computer monitor environment of FIG. 1 and the television environment of FIG. 2. Each of the filters 534 and 536 is simply a frequency independent attenuation factor, K, typically about 0.9. The input of each crossfeed leg 538 and 540 is taken from the output of an additive summer (542 and 544, respectively) in a cross channel negative feedback arrangement (each leg is subtracted at the respective summer), to generate a canceller of each previous canceller signal, as explained above. This is a very simple acoustic-crosstalk canceller to realize digitally: two summations, two multiplications, and a pair of 6-sample ring buffers for the delays. It is preferred that, if used, the acoustic-crosstalk canceller is implemented digitally in software and run in real time on a personal computer associated with the monitor 306 in FIG. 3 or on a microprocessor in the television set 406 of FIG. 4.

In accordance with the present invention, an encoder produces a composite audio-information signal representing the soundfield to be reproduced and a directional vector or "steering control signal." The composite audio-information signal has its frequency spectrum broken into a number of subbands, preferably commensurate with the critical bands of the human ear. The steering control signal has a component relating to the dominant direction of the soundfield in each of the subbands.

Although the invention may be implemented using analog or digital techniques or even a hybrid arrangement of such techniques, the invention is more conveniently implemented using digital techniques and the preferred embodiments disclosed herein are digital implementations.

In an embodiment of the invention, an encoder receives a plurality of audio streams each representing an input channel as well as localization characteristics of each of those input channels. The decoder receives an encoded signal as well as the location or virtual location of the sound transducer for each output channel, and provides a signal stream for each output channel to reproduce as accurately as possible the soundfield represented by the input channel signals. Because the spatial coding scheme of the present invention is based on the premise that only sound from a single direction is heard at any instant, the decoder need not apply a signal to more than two sound transducers at any instant. The encoded information includes for each subband an aggregate representation all of the input channels. The aggregate representation comprises a composite audio-information signal representing the net overall soundfield level, and a steering control signal comprising localization information for the soundfield. This localization information is referred to herein as a net directional vector.

In the decoder it is also the case that only one direction gets bits, thus within each critical band only one or two presentation channels get bits during each time interval (one presentation channel is adequate when the soundfield direction happens to be congruent with the presentation channel direction; otherwise, two presentation channels are required to position the soundfield direction).

One aspect the invention is a low bit-rate spatial coding system for encoding a plurality of audio streams representing a soundfield into an encoded signal and decoding the encoded signal, the system including an encoder and a decoder. The encoder comprises:

- a subband signal generator generating a plurality of subband signals in response to the plurality of audio streams, each subband signal representing a respective frequency subband of a respective one of the audio streams,
- a signal combiner generating a composite signal representing the combination of subband signals in respective frequency subbands,
- a soundfield direction detector generating a steering control signal for the composite signal indicating the principal direction of the soundfield in respective subbands,
- an encoder and bit allocator generating encoded information by allocating bits to the composite signal and the steering control signal, and
- a formatter assembling the encoded information into an encoded signal.

The decoder comprises:

- a deformatter deriving the composite signal and steering control signal from the encoded signal,
- an inverse subband generator deriving subband signals in response to the composite signal and the steering control signal,
- an information input describing the number of output channels of the decoder and the location or virtual location of sound transducers connected to the respective output channels, wherein there are three or more output channels, and
- a signal generator generating an audio stream in no more than two output channels at any instant in response to the subband signals and reproduction information.

Another aspect of the invention is a low bit-rate spatial coding system for encoding a plurality of audio streams representing a soundfield into an encoded signal, decoding the encoded signal, and reproducing an auditory likeness of the soundfield, the system including an encoder and a decoder. The encoder comprises:

- a subband signal generator generating a plurality of subband signals in response to the plurality of audio streams, each subband signal representing a respective frequency subband of a respective one of the audio streams,
- a signal combiner generating a composite signal representing the combination of subband signals in each frequency subband,
- a soundfield direction detector generating a steering control signal for the composite signal indicating the principal direction of the soundfield in each subband,
- an encoder and bit allocator generating encoded information by allocating bits to the composite signal and the steering control signal, and
- a formatter assembling the encoded information into an encoded signal.

The decoder comprises:

- a deformatter deriving the composite signal and steering control signal from the encoded signal,
- an inverse subband generator deriving subband signals in response to the composite signal and the steering control signal,
- an information input describing the number of output channels of the decoder and the location or virtual location of sound transducers connected to the respective output channels, and
- a signal generator generating an audio stream in one or more output channels in response to the subband signals and reproduction information.

The system further comprises:

- a plurality of sound transducers coupled to the output channels of the decoder and arranged so as to generate an auditory likeness of the soundfield to a listener or listeners within a spatial coding sweet-spot listening area.

Yet another aspect of the invention is a decoder for use in a low bit-rate spatial coding system for decoding an encoded signal derived from a plurality of audio streams representing a soundfield by generating a plurality of subband signals in response to the plurality of audio streams, each subband signal representing a respective frequency subband of a respective one of the audio streams, generating a composite signal representing the combination of subband signals in respective frequency subbands, generating a steering control signal for the composite signal indicating the principal direction of the soundfield in respective subbands, generating encoded information by allocating bits to the composite signal and the steering control signal, and assembling the encoded information into an encoded signal. The decoder comprises:

- a deformatter deriving the composite signal and steering control signal from the encoded signal,
- an inverse subband generator deriving subband signals in response to the composite signal and the steering control signal,
- an information input describing the number of output channels of the decoder and the location or virtual location of sound transducers connected to the respective output channels, wherein there are three or more output channels, and
- a signal generator generating an audio stream in no more than two output channels at any instant in response to the subband signals and reproduction information.

Yet one further aspect of the invention is a decoder and reproduction system for use in a low bit-rate spatial coding system for decoding and reproducing an encoded signal derived from a plurality of audio streams representing a soundfield by generating a plurality of subband signals in response to the plurality of audio streams, each subband signal representing a respective frequency subband of a respective one of the audio streams, generating a composite signal representing the combination of subband signals in respective frequency subbands, generating a steering control signal for the composite signal indicating the principal direction of the soundfield in respective subbands, generating encoded information by allocating bits to the composite signal and the steering control signal, and assembling the encoded information into an encoded signal. The decoder and reproduction system comprises:

- a deformatter deriving the composite signal and steering control signal from the encoded signal,
- an inverse subband generator deriving subband signals in response to the composite signal and the steering control signal,
- an information input describing the number of output channels of the decoder and the location or virtual location of sound transducers connected to the respective output channels, and a signal generator generating an audio stream in one or more output channels in response to the subband signals and reproduction information, and a plurality of sound transducers coupled to the output channels of the decoder and arranged so as to generate an auditory likeness of the soundfield to a listener or listeners within a spatial coding sweet-spot listening area.

The various features of the invention and its preferred embodiments are set forth in greater detail in the following DETAILED DESCRIPTION OF THE INVENTION and in the accompanying drawings.

BRIEF DESCRIPTION OF DRAWINGS

FIG. 1 is a conceptual diagram illustrating a person listening to a soundfield produced by multiple presentation channels, but who perceives that a sound comes from a point.

FIG. 2 is a plan view schematic representation of a listener positioned in an idealized spatial coding sweet spot among a five speaker "surround sound" reproduction arrangement.

FIG. 3 is a plan view schematic representation of a listener positioned in an idealized spatial coding sweet spot in front of a computer monitor having loudspeakers at its sides.

FIG. 4 is a plan view schematic representation of a listener positioned in an idealized spatial coding sweet spot in front of a television set having loudspeakers adjacent its picture tube.

FIG. 5A is a functional block diagram of a spatializer employing an acoustic-crosstalk canceller.

FIG. 5B is a functional block diagram of a modified spatializer employing an acoustic-crosstalk canceller.

FIG. 5C is a functional block diagram of a simple four-port acoustic-crosstalk canceller according to the prior art.

FIG. 6 is a conceptual block diagram showing spatial coding and decoding.

FIG. 7 is a functional block diagram illustrating the basic structure of a subband encoder.

FIG. 8 is a functional block diagram illustrating the basic structure of a subband decoder.

FIG. 9 is a functional block diagram illustrating the basic structure of the invention as it relates to subband encoding.

FIG. 10 is a functional block diagram illustrating the basic structure of the invention as it relates to subband decoding.

FIG. 11 is a hypothetical graphical representation of a reproduction system in three dimensions with five presentation channels.

FIG. 12A is a schematic functional block diagram of a spatial decoder operating in conjunction with a predictable playback environment.

FIG. 12B is a schematic functional block diagram of a spatial decoder operating in conjunction with another predictable playback environment.

DETAILED DESCRIPTION OF THE INVENTION

FIG. 6 is a conceptual illustration of an embodiment of the Type II coding system. An encoder comprising processes 604 and 606 receives subband signals representing a soundfield from a plurality of input channels 602 from a subband coder (see FIG. 7), and receives from path 603 information regarding how the soundfield is mapped onto each of those input channels. Process 604 combines the signals into a composite audio-information signal that it passes along path 608. Process 606 establishes a steering control signal representing the apparent direction of the soundfield that it passes along path 610. A decoder comprising process 612 receives from path 613 information regarding the number of output channels and the actual or virtual spatial configuration of output channel sound transducers in the presentation system, receives a composite channel signal from paths 608 and 610, and generates output signals along output channels 614 for presentation of the soundfield.

In practical applications of the spatial coder, the information to the encoder is a multiplicity of signal streams representing input channels. The encoder is concerned with the desired reproduced soundfield; therefore, it must receive information as to how those input channels are intended to relate to that soundfield. For example, in the case of a five-channel source having left, center, right, left surround and right surround reproduction by generally standardized loudspeaker locations, the net directional vector can be derived from the five channel signals intended to be applied to those loudspeaker locations.

A spatial coding decoder, receiving information as to the playback or presentation environment, can use the net directional vector to produce a set of signals for the intended five channel playback or presentation or for another playback or presentation environment using a different number of channels and/or loudspeaker locations. For example, the composite audio-information signal and net directional vector can be decoded for a two loudspeaker computer monitor environment. As discussed above, the decoding may include a "spatializer" so that the resulting presentation provides the psychoacoustical effect of a soundfield not limited to the two loudspeakers and the space between them.

The invention is not restricted for use with any particular scheme for generating multiple input channels nor any particular scheme for capturing or recreating soundfields. The invention accepts as an input at the encoder any set of multiple input channels with information necessary to define how the producer of the input channels intended them to produce a soundfield, e.g., their intended direction with respect to the listener. The encoder translates that information and those sound channels into a composite audio information signal and a net directional vector steering control signal so that the decoder may provide as an output a set of presentation channels which produce the best possible soundfield commensurate with the capabilities of the playback or presentation equipment and environment. The number of channels produced by the decoder is dictated by characteristics of the presentation system and is therefore not necessarily equal to the number of input channels.

The present invention applies to subband coders implemented by any of many well-known techniques. A preferred implementation uses a transform, more particularly a time-domain to frequency-domain transform according to the Time Domain Aliasing Cancellation (TDAC) technique. See Princen and Bradley, "Analysis/Synthesis Filter Bank Design Based on Time Domain Aliasing Cancellation," *IEEE Trans. on Acoust., Speech, Signal Proc.*, vol. ASSP-34, 1986, pp. 1153–1161. An example of a transform encoder/decoder system utilizing a TDAC transform is provided in U.S. Pat. No. 5,109,417, which is hereby incorporated by reference in its entirety.

Typical single-channel subband encoding, as shown in FIG. 7, comprises splitting an input signal stream 810 into subbands by filter bank 710, converting the subband information into quantized code words by encoder 730, and assembling the quantized code words into a form suitable for transmission or storage by formatter 740. If the filter bank is implemented by digital filters or discrete transforms, the input signal is sampled and digitized prior to filter bank filtering by sampler 700. If the filter bank is implemented by analog filters, the subband signals may be sampled and digitized by sampler 720 for digital coding by encoder 730. In one aspect, the present invention relates to encoder 730 for multiple channels of information. For example, each of the inputs 602 in FIG. 6 constitutes subband information as applied to encoder 730.

Typical single-channel digital subband decoding, as shown in FIG. 8, comprises disassembling the formatted code words by deformatter 810, recovering the subband information by decoder 820, and merging the subband information into a single-channel signal by inverse filter bank 840. If the inverse filter bank is implemented by analog filters and the signal is digitally encoded, the subband information is converted into analog form prior to the inverse filter bank filtering by converter 830. If the inverse filter bank is implemented by digital filters or discrete transforms, the digital signal is converted into analog form by converter 850. In another aspect, the present invention relates to decoder 820 for multiple channels of information.

Subband steering combines subband spectral components from one or more channels into a composite signal. The composite representation for the subband is transmitted or recorded instead of the individual channel subband spectral components represented by the composite channel subband. There are two equivalent methods of forming a composite channel. The same result is obtained using either method. One approach is first to apply intraband masking criteria to each channel in order to reduce the number of bits required for each channel by eliminating the coding of masked signal components and then, second, to combine the bit reduced channels to create a composite signal. The other approach, described below in more detail, is first to combine the original channel signals to create the composite signal and then, second, to apply intraband masking criteria to the composite signal in order to reduce bits by eliminating the coding of masked signal components. The resulting composite signal is believed to be the same or essentially the same in either case. In both cases, the spatial coder takes two types of masking into account—cross channel masking and intra band masking within the resulting composite channel. Thus, the invention is intended to cover the use of either method of forming a composite signal.

The steering control signal (or net directional vector) represents the apparent dominant direction of the spectral components from all the channels.

In accordance with the teachings of the present invention for digital encoding techniques, numerical values representing the spectral components are quantized into code words, wherein a variable number of bits may be adaptively allocated to at least some of the code words from a pool of bits. The bit allocation is based on whether, because of current signal content, quantizing errors in some subbands will degrade signal coding quality to a greater extent than quantizing errors in other subbands. More particularly, more bits are assigned to spectral components within subbands whose quantizing noise is less subject to psychoacoustic masking than quantizing noise in other subbands.

In accordance with the teachings of the present invention for decoding, inverse steering uses the steering control signal to recover a representation of the steered channels from the composite channel. Because spatial coding according to the present invention uses a single directional vector and in view of the underlying principle that a listener only hears sound from one direction at any instant, only one or two channels need to be generated for presentation on a specific presentation system. The number of channels for the decoder is dictated by characteristics of the presentation system and are therefore not necessarily equal to the number of input channels.

Also in accordance with the teachings of the present invention for digital decoding techniques, an adaptive bit allocation process substantially similar to that used during encoding is performed to establish the number of bits assigned to each quantized code word. This information is used to reconstruct the subband spectral components.

FIG. 9 is a schematic functional block diagram of a spatial coding encoder (i.e., a simplified single vector Type II encoder). The encoder may be implemented using a variety of analog and digital coding techniques. The invention is more conveniently implemented using digital techniques and the embodiments disclosed herein are digital implementations.

Digital implementations may employ adaptive bit allocation techniques. The following description of a preferred embodiment discloses both adaptive bit allocation and subband steering concepts, however, it should be understood that digital implementations of spatial coding may be utilized with bit allocation schemes that are not adaptive.

Referring to FIG. 9, subband signal components for each of the plurality of input channels 1 through N on input path 901 are processed by an apparent-direction and composite-signal generator 902 in order to establish an apparent-direction steering-control signal and a composite signal. The process also receives source information indicating how the source soundfield is mapped onto each of the input channels (information describing the intended spatial direction for each channel signal). The source and reproduction information may be, variously, permanent or programmable. The encoder may include permanent instructions regarding the source and/or playback environment or such instructions may be provided from outside the encoder via input paths as shown in FIG. 9. A composite audio-information signal representing the source soundfield is derived from the subband input signals and the source information. A steering control signal in the form of a single directional vector, comprising localization information for the soundfield, is derived from the subband input signals and the source information.

The composite signal output from block 902 is also applied to a coarse level quantizer 904 that quantizes the subband spectral information of the single composite channel. An adaptive bit allocator 908 allocates a number of bits to various subbands in response to coarse quantization information received from the coarse level quantizer 904 and the number of bits available for allocation received from a bit pool 910. A quantizer 912 adaptively quantizes the composite signal spectral information into quantized code words in response to the composite signal, the output of the coarse level quantizer, and the output of the adaptive bit allocator. Although a suitable algorithm is described below, the algorithm by which the encoder adaptively allocates bits is not critical to the present invention. Quantizer 912 also quantizes the steering control signal. Quantizer 912 provides as outputs the steering information, quantized code words, and coarse quantization information, respectively, along paths 914–918.

FIG. 10 is a schematic functional block diagram of a spatial coding decoder. An adaptive bit allocation calculator 1002 establishes the number of bits allocated to each code word during quantizing in response to coarse quantization information received from the encoder output 918 and the number of bits available for allocation received from a bit pool 1004; a dequantizer 1006 dequantizes the steering control signal received from the encoder output 914 and recovers spectral component information in response to quantized code words received from encoder output 916, coarse quantization information received from encoder output 918, and bit allocation information received from the adaptive bit allocation calculator 1002, and provides at its outputs the single directional vector information on path 1008, the composite channel subband exponents on line 1010, and the composite channel spectral components on path 1012. Those outputs are applied to an inverse apparent-direction and composite-signal generator 1014 which also receives reproduction information describing the expected number of output channels and the location or virtual location of transducers (such as loudspeakers) connected to the output channels. The reproduction information may be permanent or programmable. The decoder may include permanent instructions regarding the playback environment or such instructions may be provided from outside the decoder via an input path as shown in FIG. 10. Generator 1014 reconstructs subbands in response to steering and composite spectral information received on paths 1008–1012, providing, within each time interval in which a set of subband signals and directional vector is received, a complete set of subbands for one or two channels of subband spectral information, each channel represented as portions of a path 1016 labeled Ch 1, . . . , Ch N. The activation of only one or two channels for each subband during the time interval is sufficient to reproduce sound from a single direction within each subband. In other words, with respect to any particular subband only one or two channels will be active during each time interval.

The preferred embodiment of the present invention as it relates to encoding and decoding is presented in more detail in the following sections. Alternate embodiments and structures for the present invention are presented throughout the discussion.

Referring again to FIG. 9, which illustrates a Type II subband encoder, it may be seen that apparent direction and composite signal-generator 902 receives multiple channels of subband information along path 901. If the subband blocks are derived by a discrete transform such as the Discrete Fourier Transform (DFT), each subband will consist of one or more discrete transform coefficients. One particular subband arrangement for a 20 kHz bandwidth signal utilizes a 512 point transform and an input signal sampling rate of 48 kHz. The subbands correspond generally to the ear's critical bands. Other subband groupings, sampling rates, and transform lengths may be utilized without departing from the scope of the present invention.

As discussed above, it is believed that the single direction effect operates when there is a sufficiently short time interval. In the case of a 48 kHz sampling rate and a 512 point transform, each transform block has a time interval of roughly 10 milliseconds (in the case of a TDAC transform, this is only an approximation in view of the block to block averaging inherent in the TDAC process). Thus, a succession of composite subband signals are generated about every 10 milliseconds. Each composite block may have a single directional vector associated with it, or, alternatively, directional vectors may be generated on a regular basis more or less frequently than the block period. As a further alternative, one or more additional directional vectors may be generated within a block period only when a shift in the dominant direction greater than a threshold (say, more than 30 degrees) occurs. The inventor has found that a TDAC transform based system having block lengths of about 10 milliseconds and a single directional vector during each block period provides a pleasant musical reproduction experience.

The apparent-direction and composite-signal generator process combines the spectral components from multiple channels to form a composite single-channel subband, thereby reducing the number of spectral components that must be quantized and transmitted. A steering control signal that conveys information about the apparent direction of the soundfield (a single direction) within a time interval is passed with the encoded composite channel spectral components to permit the receiving dequantizer to recover spectral components for one or two channels, which is sufficient for a single direction reproduction. It should be appreciated that, in general, the spectral components recovered from the composite channel and single direction control signal are not identical to the spectral components a receiver would decode from discrete channels or from a composite channel and scale factors for each channel (as in a Type I system).

Bits saved by encoding a composite-channel subband and ancillary single-direction vector rather than encoding subbands of discrete channels or a composite channel subband and channel scale factors (as in the Type I system) are used by the adaptive bit allocation process, for example, to allocate to other subbands and by the quantizer to quantize the steering control signal.

The spectral components of the subbands in one or more channels are combined. According to said U.S. Pat. Nos. 5,583,962, 5,632,005, and 5,633,981, a preferred method sets each spectral component value in the composite subband equal to the average of the corresponding spectral component values in the steered channels and alternative methods may form other linear combinations or weighted sums of the spectral component values in the steered channels.

The steering control signal represents the primary (i.e., dominant) spatial direction of the subband components in the composite channel. According to the simplified version of the Type II system which is the subject of this invention, during each time interval, a basic method constructs a single vector representing only the primary or dominant spatial direction for each subband in the composite signal.

The concept of this basic method may be better understood by referring to FIG. 11 that illustrates a hypothetical reproduction system comprising five presentation channels. Each of these presentation channels, which correspond to one of the input channels, represents a loudspeaker located on the surface of a unit sphere. The intended listener is located at the sphere's center. One of the channels is labeled RF. The apparent direction to the listener of channel RF is represented by unit vector $\vec{DI}$.

According to this basic method of coding, steering control signal vector $\vec{V}_j$ represents the principal (dominant) direction of the soundfield for the composite signal subband j. Although a Cartesian coordinate system is a preferred representation for direction, other representations such as polar coordinates may be used without departing from the spirit of the invention. Each channel's directional vector is weighted by level. The steering control signal may be expressed as $$\vec{V}_j = \sum_{i=1}^{S} LI_{i,j} \cdot \vec{DI}_j = \vec{LI}_j \cdot \vec{DI} \qquad (1)$$

where $\vec{DI}_i$=directional unit vector for channel i,
$LI_{i,j}$=calculated level for subband j in channel i,
S=total number of input channels,
$\vec{V}_j$=steering control signal vector for subband j,
$\vec{DI}$=directional unit vectors for all input channels, and
$\vec{LI}_j$=calculated levels for subband j in all input channels Further details of a Type II encoder usable in the present invention are set forth in said U.S. Pat. Nos. 5,583,962, 5,632,005 and 5,633,981.

In the spatial coding decoder shown in FIG. 10, the inverse apparent-direction and composite-signal generator 1014 reconstructs a single direction representation of the composite channel in response to a steering control signal, coarse quantization levels, and spectral component values received from paths 1008 through 1012, respectively.

As explained above, Type II coding invention employs a directional vector form of steering control signal. In order to approximate the direction of the encoded signal, the reconstruction process must take into account the number and location of loudspeakers installed at the decoding site. The direction vector $\vec{DO}_i$ for each presentation channel i is provided as the reproduction information input to the inverse apparent direction and composite signal generator 1014. The reconstruction process preferably generates spectral components for only one or two presentation channels which is sufficient to obtain a soundfield with the spatial orientation of the composite signal subband represented by the steering control signal.

By applying Equation 1 to the presentation system, the steering control signal may be expressed as $$\vec{V}_j = \sum_{i=1}^{S} LO_{i,j} \cdot \vec{DO}_i = \vec{LO}_j \cdot \vec{DO} \qquad (4)$$

where $\vec{DO}_i$=directional unit vector for presentation channel i,
$LO_{i,j}$=calculated level for subband j in channel i,
S=total number of presentation channels,
$\vec{V}_j$=steering control signal vector for subband j,
$\vec{DO}$=directional unit vectors for all presentation channels, and
$\vec{LO}_j$=calculated levels for subband j in all presentation channels.

One additional constraint imposed upon the calculated levels LO is that the loudness of the soundfield produced by the presentation system should be equal to the loudness of the original soundfield. More particularly, a constraint is imposed upon each $\vec{LO}_j$ vector such that the loudness or total level of the soundfield for each subband produced by the presentation system is equal to the level of the subband in the original soundfield.

Further details of a Type II decoder usable in the present invention are set forth in said U.S. Pat. Nos. 5,583,962, 5,632,005 and 5,633,981.

FIG. 12A is a schematic functional block diagram of a spatial decoder operating in conjunction with a predictable playback environment. Steering information, quantized code words, and coarse quantization information, respectively, along input paths 1202, 1204 and 1206 are applied to a spatial decoder 1208. The input signals may be conveyed to the spatial decoder by any of a variety of transmission or storage techniques, including, for example, wired and wireless transmission, magnetic media, and optical media. As explained above, the input signals are encoded in accordance with the single vector version of the Type II system. Decoder 1208 provides four or five output signals which may be applied to an optional spatializer 1210 employing an acoustic-crosstalk canceller. The particular implementation of spatializer 1210 is not critical; suitable arrangements are described in connection with FIGS. 5A, 5B and 5C. The spatializer 1210 output, if a spatializer employed, is applied to left and right loudspeakers 1212 and 1214 (via suitable amplifying and coupling means, which are not shown), otherwise the decoder 1208 outputs are applied to the loudspeakers via suitable amplifying and coupling means (not shown). The loudspeakers, located, for example, in the manner of FIG. 3 or FIG. 4, produce an oblong spatial coding sweet spot 1216 (shown idealized) in which a listener 1217 is positioned. Spatializer 1210, if used, may, if desired, form an integral part of decoder 1208.

FIG. 12B is a schematic functional block diagram of a spatial decoder operating in conjunction with another predictable playback environment. Steering information, quantized code words, and coarse quantization information, respectively, along input paths 1202, 1204 and 1206 are applied to a spatial decoder 1208 as in the FIG. 12A arrangement. The FIG. 12B arrangement differs in that the playback environment is a standard five-loudspeaker surround sound arrangement. In this case, no spatializer is necessary. The outputs from spatial decoder 1208 are applied to the five loudspeakers—left (1218), center (1220), right (1222), left surround (1224) and right surround (1226) which produce a circular spatial coding sweet spot 1228 (shown idealized) in which a listener 1230 is positioned.

It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

I claim:

1. A low bit-rate spatial coding system for encoding a plurality of audio streams representing a soundfield into an encoded signal and decoding said encoded signal, said system including an encoder and a decoder, said encoder comprising means for generating a plurality of subband signals in response to said plurality of audio streams, each subband signal representing a respective frequency subband of a respective one of said audio streams, means for generating a composite signal representing the combination of subband signals in respective frequency subbands, means for generating a steering control signal for said composite signal indicating the principal direction of said soundfield in respective subbands, means for generating encoded information by allocating bits to said composite signal and said steering control signal, and means for assembling said encoded information into an encoded signal, and said decoder comprising means for deriving the composite signal and steering control signal from said encoded signal, means for deriving subband signals in response to said composite signal and said steering control signal, means for supplying reproduction information describing the number of output channels of said decoder and the location or virtual location of sound transducers connected to the respective output channels, wherein there are three or more output channels, and means for generating an audio stream in no more than two output channels at any instant in response to said subband signals and reproduction information.

2. A low bit-rate spatial coding system for encoding a plurality of audio streams representing a soundfield into an encoded signal, decoding said encoded signal, and reproducing an auditory likeness of said soundfield, said system including an encoder and a decoder, said encoder comprising means for generating a plurality of subband signals in response to said plurality of audio streams, each subband signal representing a respective frequency subband of a respective one of said audio streams, means for generating a composite signal representing the combination of subband signals in each frequency subband, means for generating a steering control signal for said composite signal indicating the principal direction of said soundfield in each subband, means for generating encoded information by allocating bits to said composite signal and said steering control signal, and means for assembling said encoded information into an encoded signal, said decoder comprising means for deriving the composite signal and steering control signal from said encoded signal, means for deriving subband signals in response to said composite signal and said steering control signal, means for supplying reproduction information describing the number of output channels of said decoder and the location or virtual location of sound transducers connected to the respective output channels, and means for generating an audio stream in one or more output channels in response to said subband signals and reproduction information, and further comprising a plurality of sound transducers coupled to the output channels of said decoder and arranged so as to generate an auditory likeness of said soundfield to a listener or listeners within a spatial coding sweet-spot listening area.

3. A low bit-rate spatial coding system according to claim 2 wherein there are three or more output channels, and said means for generating an audio stream in one or more output channels in response to said subband signals and reproduction information generates an audio stream in no more than two output channels at any instant.

4. A low bit-rate spatial coding system according to claim 1 or claim 2 further comprising a spatializer including an acoustic-crossfeed canceller for processing audio streams in said output channels, the spatializer providing a reduced number of output channels having audio streams with characteristics such that when coupled to sound transducers provide the auditory impression of a soundfield similar to that which would have resulted if the original number of output channels were coupled to a larger number of sound transducers.

5. A low bit-rate spatial coding system according to claim 1 or claim 2 wherein said steering control signal comprises a directional vector for each subband.

6. A low bit-rate spatial coding system according to claim 1 or claim 2 wherein said respective frequency subband has a bandwidth commensurate with a respective critical band of the human auditory system.

7. A low bit-rate spatial coding system according to claim 1 or claim 2 wherein said bits are allocated according to psychoacoustic principles.

8. A low bit-rate spatial coding system according to claim 2 wherein said decoder further comprises a spatializer including an acoustic-crossfeed canceller for processing audio streams in said output channels, whereby the auditory likeness of said soundfield generated within the spatial coding sweet-spot listening area renders the perception of a wide-stage or surround-sound soundfield.

9. A decoder for use in a low bit-rate spatial coding system for decoding an encoded signal derived from a plurality of audio streams representing a soundfield by generating a plurality of subband signals in response to the plurality of audio streams, each subband signal representing a respective frequency subband of a respective one of said audio streams, generating a composite signal representing the combination of subband signals in respective frequency subbands, generating a steering control signal for the composite signal indicating the principal direction of said soundfield in respective subbands, generating encoded information by allocating bits to the composite signal and the steering control signal, and assembling the encoded information into an encoded signal, comprising means for deriving the composite signal and steering control signal from said encoded signal, means for deriving subband signals in response to said composite signal and said steering control signal, means for supplying reproduction information describing the number of output channels of said decoder and the location or virtual location of sound transducers connected to the respective output channels, wherein there are three or more output channels, and means for generating an audio stream in no more than two output channels at any instant in response to said subband signals and reproduction information.

10. A decoder and reproduction system for use in a low bit-rate spatial coding system for decoding and reproducing an encoded signal derived from a plurality of audio streams representing a soundfield by generating a plurality of subband signals in response to the plurality of audio streams, each subband signal representing a respective frequency subband of a respective one of said audio streams, generating a composite signal representing the combination of subband signals in respective frequency subbands, generating a steering control signal for the composite signal indicating the principal direction of said soundfield in respective subbands, generating encoded information by allocating bits to the composite signal and the steering control signal, and assembling the encoded information into an encoded signal, comprising means for deriving the composite signal and steering control signal from said encoded signal, means for deriving subband signals in response to said composite signal and said steering control signal, means for supplying reproduction information describing the number of output channels of said decoder and the location or virtual location of sound transducers connected to the respective output channels, and means for generating an audio stream in one or more output channels in response to said subband signals and reproduction information, and a plurality of sound transducers coupled to the output channels of said decoder and arranged so as to generate an auditory likeness of said soundfield to a listener or listeners within a spatial coding sweet-spot listening area.

11. The combination of claim 10 wherein there are three or more output channels, and said means for generating an audio stream in one of more output channels in response to said subband signals and reproduction information generates an audio stream in no more than two output channels at any instant.

12. The combination of claim 9 or claim 10 further comprising a spatializer including an acoustic-crossfeed canceller for processing audio streams in said output channels, the spatializer providing a reduced number of output channels having audio streams with characteristics such that when coupled to sound transducers provide the auditory impression of a soundfield similar to that which would have resulted if the original number of output channels were coupled to a larger number of sound transducers.

13. The combination of claim 9 or claim 10 wherein said steering control signal comprises a directional vector for each subband.

14. The combination of claim 9 or claim 10 wherein said respective frequency subband has a bandwidth commensurate with a respective critical band of the human auditory system.

15. The combination of claim 9 or claim 10 wherein said bits are allocated according to psychoacoustic principles.

16. The combination of claim 10 wherein said decoder further comprises a spatializer including an acoustic-crossfeed canceller for processing audio streams in said output channels, whereby the auditory likeness of said soundfield generated within the spatial coding sweet-spot listening area renders the perception of a wide-stage or surround-sound soundfield.

17. A low bit-rate spatial coding system for encoding a plurality of audio streams representing a soundfield into an encoded signal and decoding said encoded signal, said system including an encoder and a decoder, said encoder comprising a subband signal generator generating a plurality of subband signals in response to said plurality of audio streams, each subband signal representing a respective frequency subband of a respective one of said audio streams, a signal combiner generating a composite signal representing the combination of subband signals in respective frequency subbands, a soundfield direction detector generating a steering control signal for said composite signal indicating the principal direction of said soundfield in respective subbands, an encoder and bit allocator generating encoded information by allocating bits to said composite signal and said steering control signal, and a formatter assembling said encoded information into an encoded signal, and said decoder comprising a deformatter deriving the composite signal and steering control signal from said encoded signal, an inverse subband generator deriving subband signals in response to said composite signal and said steering control signal, an information input describing the number of output channels of said decoder and the location or virtual location of sound transducers connected to the respective output channels, wherein there are three or more output channels, and a signal generator generating an audio stream in no more than two output channels at any instant in response to said subband signals and reproduction information.

18. A low bit-rate spatial coding system for encoding a plurality of audio streams representing a soundfield into an encoded signal, decoding said encoded signal, and reproducing an auditory likeness of said soundfield, said system including an encoder and a decoder, said encoder comprising a subband signal generator generating a plurality of subband signals in response to said plurality of audio streams, each subband signal representing a respective frequency subband of a respective one of said audio streams, a signal combiner generating a composite signal representing the combination of subband signals in each frequency subband, a soundfield direction detector generating a steering control signal for said composite signal indicating the principal direction of said soundfield in each subband, an encoder and bit allocator generating encoded information by allocating bits to said composite signal and said steering control signal, and a formatter assembling said encoded information into an encoded signal, said decoder comprising a deformatter deriving the composite signal and steering control signal from said encoded signal, an inverse subband generator deriving subband signals in response to said composite signal and said steering control signal, an information input describing the number of output channels of said decoder and the location or virtual location of sound transducers connected to the respective output channels, and a signal generator generating an audio stream in one or more output channels in response to said subband signals and reproduction information, and further comprising a plurality of sound transducers coupled to the output channels of said decoder and arranged so as to generate an auditory likeness of said soundfield to a listener or listeners within a spatial coding sweet-spot listening area.

19. A low bit-rate spatial coding system according to claim 18 wherein there are three or more output channels and said signal generator generates an audio stream in no more than two output channels at any instant.

20. A low bit-rate spatial coding system according to claim 17 or claim 18 further comprising a spatializer including an acoustic-crossfeed canceller for processing audio streams in said output channels, the spatializer providing a reduced number of output channels having audio streams with characteristics such that when coupled to sound transducers provide the auditory impression of a soundfield similar to that which would have resulted if the original number of output channels were coupled to a larger number of sound transducers.

21. A low bit-rate spatial coding system according to claim 17 or claim 18 wherein said steering control signal comprises a directional vector for each subband.

22. A low bit-rate spatial coding system according to claim 17 or claim 18 wherein said respective frequency subband has a bandwidth commensurate with a respective critical band of the human auditory system.

23. A low bit-rate spatial coding system according to claim 17 or claim 18 wherein said bits are allocated according to psychoacoustic principles.

24. A low bit-rate spatial coding system according to claim 18 wherein said decoder further comprises a spatializer including an acoustic-crossfeed canceller for processing audio streams in said output channels, whereby the auditory likeness of said soundfield generated within the spatial coding sweet-spot listening area renders the perception of a wide-stage or surround-sound soundfield.

25. A decoder for use in a low bit-rate spatial coding system for decoding an encoded signal derived from a plurality of audio streams representing a soundfield by generating a plurality of subband signals in response to the plurality of audio streams, each subband signal representing a respective frequency subband of a respective one of said audio streams, generating a composite signal representing the combination of subband signals in respective frequency subbands, generating a steering control signal for the composite signal indicating the principal direction of said soundfield in respective subbands, generating encoded information by allocating bits to the composite signal and the steering control signal, and assembling the encoded information into an encoded signal, comprising a deformatter deriving the composite signal and steering control signal from said encoded signal, an inverse subband generator deriving subband signals in response to said composite signal and said steering control signal, an information input describing the number of output channels of said decoder and the location or virtual location of sound transducers connected to the respective output channels, wherein there are three or more output channels, and a signal generator generating an audio stream in no more than two output channels at any instant in response to said subband signals and reproduction information.

26. A decoder and reproduction system for use in a low bit-rate spatial coding system for decoding and reproducing an encoded signal derived from a plurality of audio streams representing a soundfield by generating a plurality of subband signals in response to the plurality of audio streams, each subband signal representing a respective frequency subband of a respective one of said audio streams, generating a composite signal representing the combination of subband signals in respective frequency subbands, generating a steering control signal for the composite signal indicating the principal direction of said soundfield in respective subbands, generating encoded information by allocating bits to the composite signal and the steering control signal, and assembling the encoded information into an encoded signal, comprising a deformatter deriving the composite signal and steering control signal from said encoded signal, an inverse subband generator deriving subband signals in response to said composite signal and said steering control signal, an information input describing the number of output channels of said decoder and the location or virtual location of sound transducers connected to the respective output channels, and a signal generator generating an audio stream in one or more output channels in response to said subband signals and reproduction information, and a plurality of sound transducers coupled to the output channels of said decoder and arranged so as to generate an auditory likeness of said soundfield to a listener or listeners within a spatial coding sweet-spot listening area.

27. The combination of claim 26 wherein there are three or more output channels, and said generator generates an audio stream in no more than two output channels at any instant.

28. The combination of claim 25 or claim 26 further comprising a spatializer including an acoustic-crossfeed canceller for processing audio streams in said output channels, the spatializer providing a reduced number of output channels having audio streams with characteristics such that when coupled to sound transducers provide the auditory impression of a soundfield similar to that which would have resulted if the original number of output channels were coupled to a larger number of sound transducers.

29. The combination of claim 25 or claim 26 wherein said steering control signal comprises a directional vector for each subband.

30. The combination of claim 25 or claim 26 wherein said respective frequency subband has a bandwidth commensurate with a respective critical band of the human auditory system.

31. The combination of claim 25 or claim 26 wherein said bits are allocated according to psychoacoustic principles.

32. The combination of claim 26 wherein said decoder further comprises a spatializer including an acoustic-crossfeed canceller for processing audio streams in said output channels, whereby the auditory likeness of said soundfield generated within the spatial coding sweet-spot listening area renders the perception of a wide-stage or surround-sound soundfield.

33. A low bit-rate spatial coding method for encoding a plurality of audio streams representing a soundfield into an encoded signal and decoding said encoded signal, said method including encoding and decoding, said encoding comprising generating a plurality of subband signals in response to said plurality of audio streams, each subband signal representing a respective frequency subband of a respective one of said audio streams, generating a composite signal representing the combination of subband signals in respective frequency subbands, generating a steering control signal for said composite signal indicating the principal direction of said soundfield in respective subbands, generating encoded information by allocating bits to said composite signal and said steering control signal, and assembling said encoded information into an encoded signal, and said decoding comprising deriving the composite signal and steering control signal from said encoded signal, deriving subband signals in response to said composite signal and said steering control signal, supplying reproduction information describing the number of output channels of said decoder and the location or virtual location of sound transducers connected to the respective output channels, wherein there are three or more output channels, and generating an audio stream in no more than two output channels at any instant in response to said subband signals and reproduction information.

34. A low bit-rate spatial coding method for encoding a plurality of audio streams representing a soundfield into an encoded signal, decoding said encoded signal, and reproducing an auditory likeness of said soundfield, said method including an encoder and a decoder, said encoding comprising generating a plurality of subband signals in response to said plurality of audio streams, each subband signal representing a respective frequency subband of a respective one of said audio streams, generating a composite signal representing the combination of subband signals in each frequency subband, generating a steering control signal for said composite signal indicating the principal direction of said soundfield in each subband, generating encoded information by allocating bits to said composite signal and said steering control signal, and assembling said encoded information into an encoded signal, said decoding comprising deriving the composite signal and steering control signal from said encoded signal, deriving subband signals in response to said composite signal and said steering control signal, supplying reproduction information describing the number of output channels of said decoder and the location or virtual location of sound transducers connected to the respective output channels, and generating an audio stream in one or more output channels in response to said subband signals and reproduction information, and further comprising coupling said output channels to a plurality of sound transducers arranged so as to generate an auditory likeness of said soundfield to a listener or listeners within a spatial coding sweet-spot listening area.

35. A low bit-rate spatial coding method according to claim 34 wherein there are three or more output channels, and said generating an audio stream in one of more output channels in response to said subband signals and reproduction information generates an audio stream in no more than two output channels at any instant.

36. A low bit-rate spatial coding method according to claim 33 or claim 34 further comprising processing audio streams in said output channels with a spatializer including an acoustic-crossfeed canceller, said processing providing a reduced number of output channels having audio streams with characteristics such that when coupled to sound transducers provide the auditory impression of a soundfield similar to that which would have resulted if the original number of output channels were coupled to a larger number of sound transducers.

37. A low bit-rate spatial coding method according to claim 33 or claim 34 wherein said steering control signal comprises a directional vector for each subband.

38. A low bit-rate spatial coding method according to claim 33 or claim 34 wherein said respective frequency subband has a bandwidth commensurate with a respective critical band of the human auditory system.

39. A low bit-rate spatial coding method according to claim 33 or claim 34 wherein said bits are allocated according to psychoacoustic principles.

40. A low bit-rate spatial coding method according to claim 34 wherein said decoder further comprises processing audio streams in said output channels with a spatializer including an acoustic-crossfeed canceller, whereby the auditory likeness of said soundfield generated within the spatial coding sweet-spot listening area renders the perception of a wide-stage or surround-sound soundfield.

41. A low bit-rate spatial coding decoding method for decoding an encoded signal derived from a plurality of audio streams representing a soundfield by generating a plurality of subband signals in response to the plurality of audio streams, each subband signal representing a respective frequency subband of a respective one of said audio streams, generating a composite signal representing the combination of subband signals in respective frequency subbands, generating a steering control signal for the composite signal indicating the principal direction of said soundfield in respective subbands, generating encoded information by allocating bits to the composite signal and the steering control signal, and assembling the encoded information into an encoded signal, comprising deriving the composite signal and steering control signal from said encoded signal, deriving subband signals in response to said composite signal and said steering control signal, supplying reproduction information describing the number of output channels of said decoder and the location or virtual location of sound transducers connected to the respective output channels, wherein there are three or more output channels, and generating an audio stream in no more than two output channels at any instant in response to said subband signals and reproduction information.

42. A low bit-rate spatial coding decoding and reproduction method for decoding and reproducing an encoded signal derived from a plurality of audio streams representing a soundfield by generating a plurality of subband signals in response to the plurality of audio streams, each subband signal representing a respective frequency subband of a respective one of said audio streams, generating a composite signal representing the combination of subband signals in respective frequency subbands, generating a steering control signal for the composite signal indicating the principal direction of said soundfield in respective subbands, generating encoded information by allocating bits to the composite signal and the steering control signal, and assembling the encoded information into an encoded signal, comprising deriving the composite signal and steering control signal from said encoded signal, deriving subband signals in response to said composite signal and said steering control signal, supplying reproduction information describing the number of output channels of said decoder and the location or virtual location of sound transducers connected to the respective output channels, and generating an audio stream in one or more output channels in response to said subband signals and reproduction information, and coupling a plurality of sound transducers to the output channels of said decoder, the sound transducers arranged so as to generate an auditory likeness of said soundfield to a listener or listeners within a spatial coding sweet-spot listening area.

43. The method of claim 42 wherein there are three or more output channels, and said generating an audio stream in one of more output channels in response to said subband signals and reproduction information generates an audio stream in no more than two output channels at any instant.

44. The method of claim 41 or claim 42 further comprising processing audio streams in said output channels with a spatializer including an acoustic-crossfeed canceller, said processing providing a reduced number of output channels having audio streams with characteristics such that when coupled to sound transducers provide the auditory impression of a soundfield similar to that which would have resulted if the original number of output channels were coupled to a larger number of sound transducers.

45. The method of claim 41 or claim 42 wherein said steering control signal comprises a directional vector for each subband.

46. The method of claim 41 or claim 42 wherein said respective frequency subband has a bandwidth commensurate with a respective critical band of the human auditory system.

47. The method of claim 41 or claim 42 wherein said bits are allocated according to psychoacoustic principles.

48. The method of claim 42 further comprising processing audio streams in said output channels with a spatializer including an acoustic-crossfeed canceller, whereby the auditory likeness of said soundfield generated within the spatial coding sweet-spot listening area renders the perception of a wide-stage or surround-sound soundfield.

* * * * *